US012732885B2

(12) United States Patent
Lim et al.

(10) Patent No.: US 12,732,885 B2
(45) Date of Patent: Sep. 8, 2026

(54) METHOD AND APPARATUS FOR REASSIGNMENT OF ACCESS AND MOBILITY MANAGEMENT FUNCTION IN COMMUNICATION SYSTEM

(71) Applicant: SAMSUNG ELECTRONICS CO., LTD., Suwon-si (KR)

(72) Inventors: Taehyung Lim, Suwon-si (KR); Jungje Son, Suwon-si (KR); Duckey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 18/557,177

(22) PCT Filed: Apr. 22, 2022

(86) PCT No.: PCT/KR2022/005763
§ 371 (c)(1),
(2) Date: Oct. 25, 2023

(87) PCT Pub. No.: WO2022/231215
PCT Pub. Date: Nov. 3, 2022

(65) Prior Publication Data

US 2024/0214902 A1 Jun. 27, 2024

(30) Foreign Application Priority Data

Apr. 27, 2021 (KR) ........................ 10-2021-0054552
May 17, 2021 (KR) ........................ 10-2021-0063470
Jun. 24, 2021 (KR) ........................ 10-2021-0082125

(51) Int. Cl.
*H04W 36/38* (2009.01)
*H04W 12/033* (2021.01)
(Continued)

(52) U.S. Cl.
CPC ....... *H04W 36/385* (2013.01); *H04W 12/033* (2021.01); *H04W 36/0038* (2013.01); *H04W 60/00* (2013.01)

(58) Field of Classification Search
CPC .. H04L 2209/80; H04L 9/3213; H04W 12/03; H04W 12/033; H04W 12/04;
(Continued)

(56) References Cited

U.S. PATENT DOCUMENTS 11,277,791 B2 * 3/2022 Thorat .................. H04W 48/16
2018/0227871 A1 8/2018 Singh et al.
(Continued)

FOREIGN PATENT DOCUMENTS

WO 2020254359 A1 12/2020
WO 2021032610 A1 2/2021

OTHER PUBLICATIONS

Supplementary European Search Report dated Jan. 4, 2024, in connection with European Patent Application No. 22796048.1, 17 pages.
(Continued)

*Primary Examiner* — Kashif Siddiqui

(57) ABSTRACT

A method for carrying out AMF reassignment in a communication system may comprise the steps of: transmitting, to an NSSF, a first request message including at least one of a first parameter for requesting a public key of an AMF that is to be reassigned and a second parameter for requesting a token related to the AMF that is to be reassigned; receiving, from the NSSF, a first response message including at least one of information indicating a target AMF set, and a public key of the target AMF set or the token; generating, on the basis of first security context for user equipment, an SC container including second security context for a target AMF; encrypting the SC container by using the public key;
(Continued)

and transmitting, to the target AMF via a radio access network related to the user equipment, at least one of the encrypted SC container, additional information related to encryption of the SC container, and the token.

14 Claims, 8 Drawing Sheets

(51) Int. Cl.
*H04W 36/00* (2009.01)
*H04W 60/00* (2009.01)

(58) Field of Classification Search
CPC . H04W 36/00; H04W 36/0038; H04W 36/38; H04W 36/385; H04W 60/00
See application file for complete search history.

(56) References Cited

U.S. PATENT DOCUMENTS

| | | | | |
|---|---|---|---|---|
| 2018/0317163 | A1* | 11/2018 | Lee | H04W 4/70 |
| 2020/0154350 | A1 | 5/2020 | Dao et al. | |
| 2021/0136602 | A1* | 5/2021 | Pokkunuri | H04W 24/02 |
| 2022/0248316 | A1* | 8/2022 | Castellanos Zamora | H04L 67/51 |
| 2024/0121610 | A1* | 4/2024 | Rajadurai | H04W 12/60 |

OTHER PUBLICATIONS

Samsung, "Update to Solution #10," 3GPP TSG-SA3 Meeting #104-e, e-meeting, Aug. 2021, S3-212926, 4 pages.

Ericsson, "AMF re-allocation: New solution with reroute of Registration Request and protected security context via RAN," 3GPP TSG-SA3 Meeting #102Bis-e, e-meeting, S3-211093, 6 pages.

International Search Report and Written Opinion of the International Searching Authority dated Jul. 28, 2022, in connection with International Application No. PCT/KR2022/005763, 10 pages.

Lenovo et al., "NSAC in case of mobility with AMF change," S2-2103469, 3GPP TSG-WG SA2 Meeting #144E (e-meeting), Elbonia, Apr. 2021, 18 pages.

Samsung et al., "Introduction of Leaving procedure—5GS," S3-2103033, 3GPP TSG-WG SA2 Meeting #144E (e-meeting), Elbonia, Apr. 2021, 38 pages.

Samsung, "Use of TAI(s) for slice restriction based on analytics," S2-2103257, SA WG2 Meeting #144E e-meeting, Elbonia, Apr. 2021, 6 pages.

* cited by examiner

METHOD AND APPARATUS FOR REASSIGNMENT OF ACCESS AND MOBILITY MANAGEMENT FUNCTION IN COMMUNICATION SYSTEM

CROSS-REFERENCE TO RELATED APPLICATIONS

This application is a National Phase Entry of PCT International Application No. PCT/KR2022/005763, which was filed on Apr. 22, 2022, and claims priority to Korean Patent Application Nos. 10-2021-0054552, 10-2021-0063470 and 10-2021-0082125, which were filed in the Korean Intellectual Property Office on Apr. 27, 2021, May 17, 2021 and Jun. 24, 2021, respectively, the entire disclosure of each of which is incorporated herein by reference.

TECHNICAL FIELD

The disclosure relates to communication systems and, more specifically, to a method and device for performing access and mobility management function (AMF) reallocation using an asymmetric encryption scheme.

BACKGROUND ART

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post long term evolution (LTE) system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (COMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing information technology (IT) techniques and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network (RAN) as a Big data processing technique may be said to be an example of the convergence of the 5G and IoT technologies. As described above, as mobile communication systems evolve to provide various services, a need arises for a method for effectively providing such services.

The 5G system considers support for various services as compared with the legacy 4G system. For example, most representative services may include, e.g., enhanced mobile broadband (eMBB), ultra-reliable and low latency communication (URLLC), massive machine-type communication (mMTC), and evolved multimedia broadcast/multicast service (eMBMS). The system providing the URLLC service and the system providing the eMBB service, respectively, may be referred to as a URLLC system and an eMBB system. Further, the terms "service" and "system" may be interchangeably used.

Among them, the URLLC service is a service newly considered in the 5G system unlike in the legacy 4G system and, as compared with the other services, this service requires that ultra-high reliability (e.g., a packet error rate of about 10 to about −5) and low latency (e.g., about 0.5 msec) be met. To meet such strict requirements, the URLLC service may adopt a shorter transmission time interval (TTI) than that of the eMBB service and takes into consideration various operation methods utilizing the same.

Meanwhile, the 3GPP, which is in charge of cellular mobile communication standardization, has named the new core network structure 5G core (5GC) and standardized the same to promote the evolution from the legacy 4G LTE system to the 5G system.

5GC supports the following differentiated functions as compared to the evolved packet core (EPC), which is the legacy network core for 4G.

First, 5GC adopts the network slicing function. 5GC is required to support various types of user equipment (UE) and services. For example, such services may include enhanced mobile broadband (eMBB), ultra-reliable low latency communications (URLLC), and massive machine-type communications (mMTC). These UEs/services have different requirements for the core network. For example, the eMBB service requires a high data rate while the URLLC service requires high stability and low latency. Network slicing is technology proposed to meet such various requirements.

Network slicing is a method for creating multiple logical networks by virtualizing one physical network, and the network slice instances (NSIs) may have different characteristics. Therefore, various service requirements may be met by allowing each NSI to have a network function (NF) suited for its characteristics. Various 5G services may be efficiently supported by allocating an NSI meeting required service characteristics for each UE.

Second, 5GC may seamlessly support the network virtualization paradigm by separating the mobility management function and the session management function. In legacy 4G LTE, all UEs may receive services over the network through signaling exchange with a single core device called the mobility management entity (MME) in charge of registration, authentication, mobility management and session management functions. However, in 5G, the number of UEs explosively increases and mobility and traffic/session characteristics that need to be supported according to the type of UE are subdivided. Resultantly, if all functions are supported by a single device, such as MME, the scalability of adding entities for each required function may decrease. Accordingly, various functions are under development based on a structure that separates the mobility management function and the session management function to enhance the scalability in terms of function/implementation complexity of the core equipment in charge of the control plane and the signaling load.

DETAILED DESCRIPTION OF THE INVENTION

Technical Problem

In 5GC, the access and mobility function (AMF) is an entity that serves as part of the MME in 4G and may be configured to maintain non-access stratum (NAS) signaling access with the UE, manage the UE registration procedure, and respond to paging.

The AMF where the UE first attempts to register may be referred to as the initial AMF. AMF reallocation from the initial AMF to the target AMF may be performed when the initial AMF may no longer serve the UE.

In this case, because security has been established between the UE and the initial AMF, the UE may reject "unprotected messages" coming from external entities (e.g., target AMF). Since the target AMF does not know the security context formed between 'UE and the initial AMF', it cannot send a protected message to the UE using the security context, and therefore, the registration procedure cannot be completed between the target AMF and the UE.

Various embodiments of the disclosure may provide a method and device for completing registration between a target AMF and a UE upon AMF reallocation.

Various embodiments of the disclosure may provide a method and device for preventing failure in UE registration with a target AMF upon AMF reallocation.

Various embodiments of the disclosure may address issues that may occur when the initial AMF transfers the UE's registration request message to the target AMF through the RAN during an AMF reallocation scenario. The above issues may be addressed as the initial AMF transmits the security context (SC) established between itself and the UE to the target AMF. The transferred security context may be protected not to be read by unintended network entities and may be designed to be safe from cryptographic attacks, such as replay attacks. Further, the target AMF may verify the reliability of the initial AMF that sent the security context.

Various embodiments of the disclosure may provide a method and device for performing an AMF reallocation procedure using asymmetric cryptography.

The technical problems to be achieved in the embodiments of the present disclosure are not limited to the technical problems mentioned above, and other technical problems not mentioned will be clearly understood by a person with ordinary knowledge in the technical field to which the embodiments of the present disclosure belong from the description below.

Technical Solution

A method by an initial AMF performing access and mobility management function (AMF) reallocation in a communication system according to an embodiment may comprise receiving a registration request message from a user equipment (UE), obtaining a first security context for the UE, transmitting, to a network slice selection function (NSSF), a first request message including at least one of a first parameter requesting a public key of an AMF to be reallocated or a second parameter requesting a token related to the AMF to be reallocated, receiving, from the NSSF, a first response message including information indicating a target AMF set and at least one of a public key of the target AMF set or the token, generating a security context container including a second security context for a target AMF based on the first security context, encrypting the security context container using the public key, and transmitting the encrypted security context container and at least one of additional information related to encryption of the security context container and the token to the target AMF through a radio access network related to the UE.

A method by an initial AMF performing access and mobility management function (AMF) reallocation in a communication system according to an embodiment may comprise receiving a registration request message from a UE, obtaining a first security context for the UE, transmitting, to a network slice selection function (NSSF), a first request message including a first parameter requesting a public key of an AMF to be reallocated, receiving, from the NSSF, a first response message including information indicating a target AMF set, transmitting, to a network repository function (NRF) (155), a second request message including a second parameter requesting a token related to the AMF to be reallocated, receiving, from the NRF (155), a second response message including a token related to the target AMF set, generating a security context container including a second security context for a target AMF based on the first security context, encrypting the security context container using the public key, and transmitting the encrypted security context container and at least one of additional information related to encryption of the security context container and the token to the target AMF through a radio access network related to the UE.

A method by an initial AMF performing access and mobility management function (AMF) reallocation in a communication system according to an embodiment may comprise receiving a registration request message from a UE, obtaining a first security context for the UE, transmitting, to a network slice selection function (NSSF), a first request message for network slice selection, receiving, from the NSSF, a first response message including information indicating a target AMF set, transmitting, to a network repository function (NRF) (155), a second request message including at least one of a first parameter requesting a public key of the target AMF set or a second parameter requesting a token related to the target AMF set, receiving, from the NRF (155), a second response message including at least one of the public key of the target AMF set or the token, generating a security context container including a second security context for a target AMF based on the first security context, encrypting the security context container using the public key, and transmitting the encrypted security context container and at least one of additional information related to encryption of the security context container and the token to the target AMF through a radio access network related to the UE.

A method by a target AMF performing access and mobility management function (AMF) reallocation in a communication system according to an embodiment may comprise receiving, from a base station, an initial UE message including at least one of a registration request message of a UE, information for identifying a target AMF set, an encrypted security context container, additional information, or a token, verifying the token, obtaining a security context container including a security context for the UE transmitted by an initial AMF by decrypting the encrypted security context container using the additional information, and performing a registration procedure with the UE using the security context.

Advantageous Effects

According to various embodiments of the disclosure, the 'security context (SC)' formed between the UE and the initial AMF' may be transferred to the target AMF. The target AMF may send a protected message to the UE using the security context. The UE may complete the normal registration procedure without rejecting the message.

According to various embodiments of the disclosure, the target AMF may verify the reliability of the initial AMF that sent a related security context to the UE. The target AMF may verify whether the initial AMF that sent the security context is a reliable entity so that the received security context may be trusted and used.

According to various embodiments of the disclosure, the security context transmitted from the initial AMF to the target AMF is transferred in a protected state not to be viewed by other entities than the initial AMF and the target AMF and may be protected from replay attacks. Therefore, from a security perspective, the security context may be safely transferred.

Effects obtainable from various embodiments are not limited to the foregoing, and other unmentioned effects would readily be appreciated by one of ordinary skill in the art from the following description.

MODE FOR CARRYING OUT THE INVENTION

Figure 1:
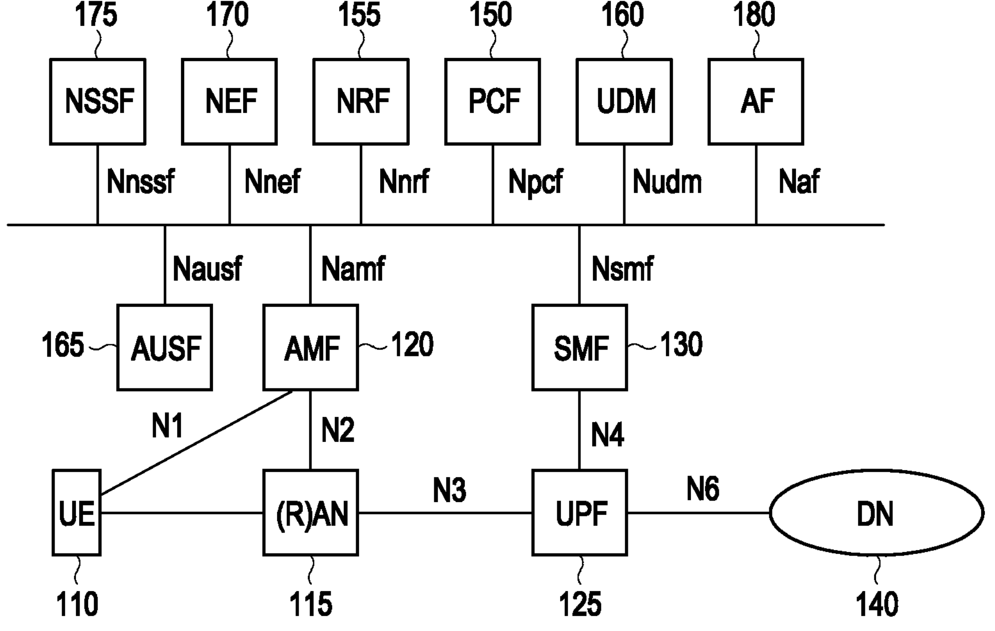
FIG. 1 is a view illustrating a 5G system network architecture according to an embodiment of the disclosure.

Hereinafter, embodiments of the present invention are described in detail with reference to the accompanying drawings. When determined to make the subject matter of the present invention unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure.

For the same reasons, some elements may be exaggerated or schematically shown. The size of each element does not necessarily reflects the real size of the element. The same reference numeral is used to refer to the same element throughout the drawings.

Advantages and features of the present disclosure, and methods for achieving the same may be understood through the embodiments to be described below taken in conjunction with the accompanying drawings. However, the present invention is not limited to the embodiments disclosed herein, and various changes may be made thereto. The embodiments disclosed herein are provided only to inform one of ordinary skilled in the art of the category of the present disclosure. The present invention is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, a 'unit' is not limited to software or hardware. A 'unit' may be configured in a storage medium that may be addressed or may be configured to execute one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the 'units' may be combined into smaller numbers of components and 'units' or further separated into additional components and 'units'. Further, the components and 'units' may be implemented to execute one or more CPUs in a device or secure multimedia card.

Hereinafter, the base station may be an entity allocating resource to terminal and may be at least one of eNodeB (eNB), Node B, base station (BS), radio access network (RAN), access network (AN), RAN node, NR NB, gNB, wireless access unit, base station controller, or node over network. The terminal may include UE (user equipment), MS (mobile station), cellular phone, smartphone, computer, or multimedia system capable of performing communication functions. In the disclosure, downlink (DL) refers to a wireless transmission path of signal transmitted from the base station to the terminal, and uplink (UL) refers to a wireless transmission path of signal transmitted from the terminal to the base station. Further, although LTE- or LTE-A-based system is described in connection with embodiments of the present invention, as an example, embodiments of the present invention may also apply to other communication systems with similar technical background or channel form. Further, embodiments of the present invention may be modified in such a range as not to significantly depart from the scope of the present invention under the determination by one of ordinary skill in the art and such modifications may be applicable to other communication systems.

A unit performing each function provided by the 5G network system may be defined as a network function (NF). An example of the structure of a 5G mobile communication network is shown in FIG. 1.

FIG. 1 is a view illustrating a network architecture for a 5G system according to an embodiment of the disclosure.

Referring to FIG. 1, the network architecture may include at least one of an access and mobility management function (AMF) 120 for managing network access and mobility of a user equipment (UE) 110, a session management function (SMF) 130 for performing session-related functions for the UE 110, a user plane function (UPF) 125 that is in charge of transferring user data and being controlled by the SMF 130, an application function (AF) 180 that communicates with 5GC to provide application services, a network exposure function (NEF) 170 that supports communication with the AF 180, a unified data management (UDM) 160 and a unified data repository (UDR) for data storage and management, a policy and control function (PCF) 150 for managing policies, or a data network (DN) 140 (e.g., Internet) where user data is transferred.

In addition to the above-described NFs, there may be an operation, administration, and management (OAM) server (not shown) that is a system for managing the UE 110 and the 5G mobile communication network. The 5G network system may further include a RAN (e.g., a base station) 115, an authentication server function (AUSF) 165, a network slice selection function (NSSF) 175, and a network repository function (NRF) 155.

Various embodiments of procedures in which AMF reallocation is performed are described below.

Various roles of the AMF according to embodiments of the disclosure are as follows.

The old AMF is the AMF where the UE last successfully registered. In various embodiments, the presence of an old AMF (and a series of procedures with which the old AMF is associated) is not required and may be omitted if necessary.

The initial AMF is the AMF where the UE first attempted to register.

The target AMF is the AMF with which the UE is registered (or undergoes the final step of registration or attempts to undergo the final step of registration) through AMF reallocation.

In an embodiment of AMF reallocation, when the AMF may no longer serve the UE after the UE sends a registration request message to the initial AMF and security is formed between the initial AMF and the UE (e.g., due to new registration, handover, or network slice switch), the initial AMF may transfer an access request message of the UE to the target AMF through the RAN (e.g., base station). The UE may finally register with the target AMF in response to the access request message.

In an embodiment, when the UE registers with the initial AMF, a security context may be established between the UE and the initial AMF. The security context is information used for secure communication between the UE and the initial AMF and may include at least part of, e.g., the shared secret key or shared common root key, or a key used for encryption/integrity protection derived from the root key, or other information related thereto.

Figure 2:
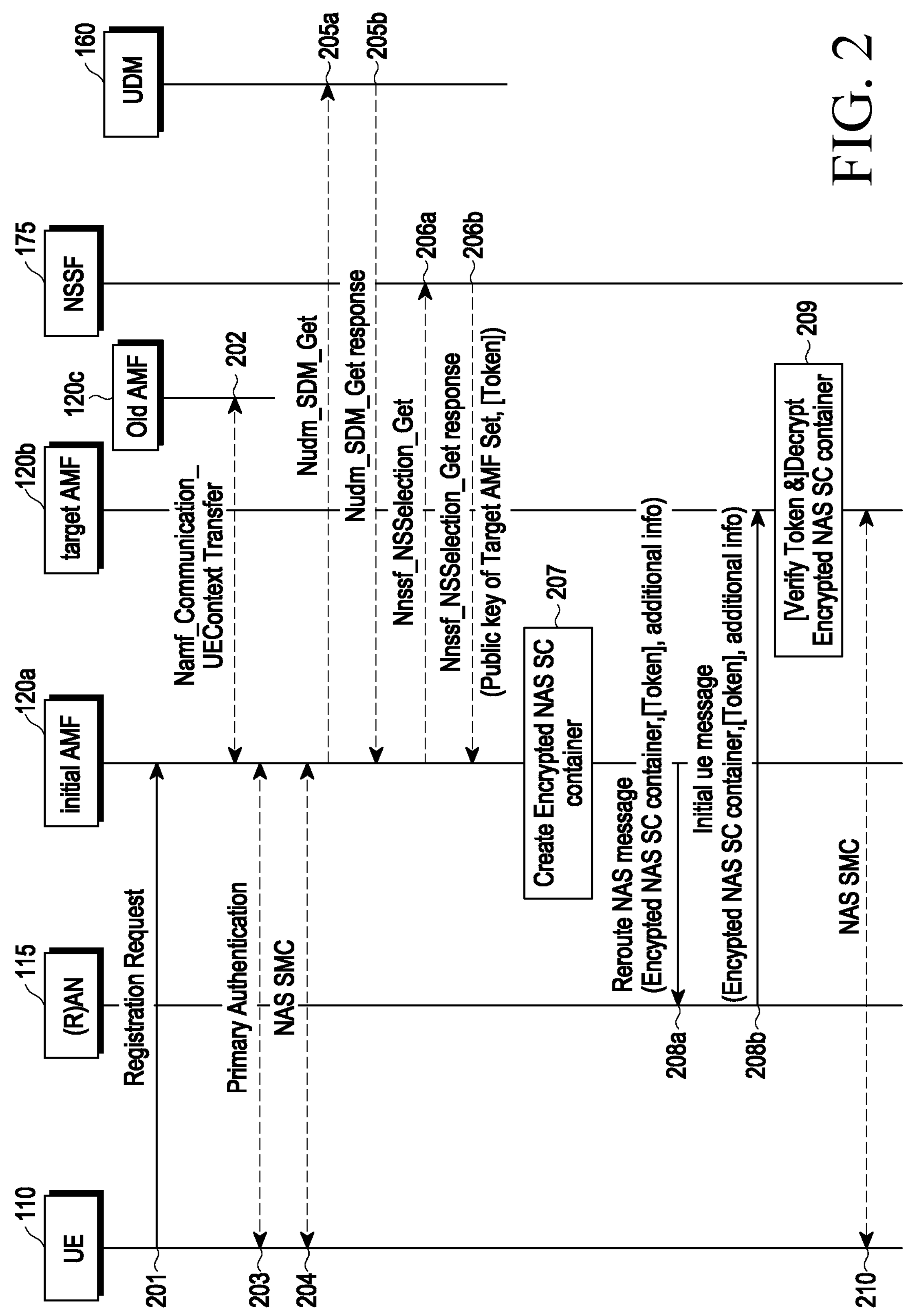
FIG. 2 is a view illustrating an example AMF reallocation procedure according to various embodiments of the disclosure.

FIG. 2 is a view illustrating an example AMF reallocation procedure according to various embodiments of the disclosure. Various embodiments may be implemented, including at least one of the steps described below.

For the procedure disclosed in FIG. 2, one or more of the following configurations may be performed in advance.

(A1) Pre-Configuration 1

All AMFs present in the communication network (including, e.g., the initial AMF 120*a*, the target AMF 120*b*, and the old AMF 120*c*) may be comprised of one or more AMF sets. Each AMF set may be constituted of one or more AMFs. In this case, encryption information for AMF reallocation (e.g., an asymmetric key pair including a public key and a secret key) may be assigned to each AMF set, and AMFs belonging to one AMF set may have the corresponding public key and/or secret key.

(A2) Pre-Configuration 2

A credential that may verify the token issued by the NSSF 175 may be shared with the target AMF 120*b*. For example, the target AMF 120*b* may have, as an example of the credential, the public key of the NSSF 175 for verifying the electronic signature of the NSSF 175 or information associated with the public key (e.g., which may include an address for obtaining the public key of the NSSF 175) or an encryption key for verifying the message authentication code (MAC) generated by the NSSF 175 (or the shared secret for deriving the encryption key).

Referring to FIG. 2, in step 201, the UE 110 may transmit a registration request (RR) message to the initial AMF 120*a* through the RAN (e.g., base station) 115. In an embodiment, the registration request message may include information for identifying the UE 110 (e.g., any one of 5G-global unique temporary identifier (GUTI) or subscription concealed identifier (SUCI)). In an embodiment, the registration request message may further include network slicing information (e.g., requested network slice selection assistance information (NSSAI)) indicating the network slice(s) requested by the UE 110.

In an embodiment, if SUCI is included in the registration request message in step 201, step 202 may be omitted.

In an embodiment, if the registration request message in step 201 includes a 5G-GUTI, but there is no connection between the initial AMF 120*a* and the old AMF 120*c* (e.g., the AMF associated with the 5G-GUTI), step 202 may be omitted.

In an embodiment, if the registration request message in step 201 includes the 5G-GUTI and there is a connection between the initial AMF 120*a* and the old AMF 120*c* (e.g., the AMF associated with the 5G-GUTI), in step 202, the initial AMF 120*a* may transmit a request message (e.g., Namf_Communication_UEContext Transfer message) for requesting the transfer of the UE context to the old AMF 120*c*, and may receive a response including the UE context from the old AMF 120*c*. The UE context may include a security context established between the old AMF 120*c* and the UE 110. The security context may include security information that has been shared between the old AMF 120*c* and the UE 110 (including, e.g., at least one of a root key that has been shared between the old AMF 120*c* and the UE 110 or a key for encryption/integrity protection derived from the root key).

In an embodiment, the old AMF 120*c* may transmit the security context between the old AMF 120*c* and the UE 110 as it is in step 202. In an embodiment, the old AMF 120*c* may derive a new security context using the security context used between the old AMF 120*c* and the UE 110 in step 202 (including, e.g., an operation of deriving a new key using horizontal key derivation and then generating a new security context including the new key) and then transmit the new security context to the initial AMF 120*a*.

In step 203, primary authentication may be performed between the UE 110 and the initial AMF 120*a*. Through the primary authentication, the UE 110 and the initial AMF 120*a* may authenticate each other. Through the primary authentication, the UE 110 and the initial AMF 120*a* may share a security context to be used for future encryption communication with each other.

In an embodiment, step 203 may be performed when the SUCI is included in the registration request message of step 201. In an embodiment, step 203 may be performed when 5G-GUTI is included in the registration request message of step 201 but there is no connection between the initial AMF 120*a* and the old AMF 120*c*, or when the initial AMF 120*a* fails to properly obtain the security context formed between the UE 110 and the old AMF 120*c* from the old AMF 120*c* although there is a connection between the initial AMF 120*a* and the old AMF 120*c*.

In step 204, the UE 110 and the initial AMF 120*a* may generate security information (e.g., including keys) to be used for secure communication between the UE 110 and the initial AMF 120*a*.

In an embodiment, step 204 may be performed when step 203 is performed, e.g., when primary authentication is performed between the UE 110 and the initial AMF 120*a* and the security context is shared. In an embodiment, step 204 may be performed when the old AMF 120*c* derives a new security context and provides the new security context to the initial AMF 120*a* in step 202.

Through steps 202 to 204, a security context may be formed between the UE 110 and the initial AMF 120*a*. For example, encryption keys to be used for secure communication may be shared between the UE 110 and the initial AMF 120*a*. After step 204, when an unprotected message is received using at least one of the security context or the encryption keys, the UE 110 may reject the received message.

In an embodiment, the initial AMF 120*a* may perform the following steps 205*a* and 205*b* to obtain subscription information of the UE 110 for determining whether to reallocate the AMF from the UDM 160.

In step 205*a*, the initial AMF 120*a* may transmit a request message for subscription information of the UE 110, e.g., a Nudm_SDM(subscription data management)_Get message, to the UDM 160. In an embodiment, although not disclosed in the drawings, the UDM 160 may obtain the subscription information from the UDR.

In step 205*b*, the UDM 160 may include the requested subscription information of the UE 110 in a response message, e.g., a Nudm_SDM_Get response message, and may transmit the response message to the initial AMF 120*a*.

In an embodiment, when it is determined that the initial AMF 120*a* is no longer capable of serving the UE 110 (for example, when the initial AMF 120*a* does not support all network slices requested by the UE 110 through the registration request message), the following steps 206*a* and 206*b* may be performed.

In step 206*a*, the initial AMF 120*a* may transmit a request message for slice selection, e.g., the Nnssf_NSSelection_Get message, to the NSSF 175. In an embodiment, the Nnssf_NSSelection_Get message may include one or more of the following information:

- Information indicating network slices requested by the UE 110 (e.g., requested NSSAI(s)),
- Information indicating network slices allowed to be used by the UE 110 (e.g., allowed NSSAI(s)), or
- Information related to the UE 110 (e.g., public land mobile network (PLMN) ID of subscription permanent identifier (SUPI) identifying the UE 110)

In an embodiment, the Nnssf_NSSelection_Get message is information for requesting "information of the AMF to be reallocated", and may further include, e.g., a parameter for requesting encryption information (e.g., a public key) of the target AMF 120*b* (or the AMF set including the target AMF 120*b*). In an embodiment, the Nnssf_NSSelection_Get message may further include a parameter for requesting a token issued by the NSSF 175.

In step 206*b*, the NSSF 175 may provide a response message including "information of the AMF to be reallocated", e.g., the Nnssf_NSSelection_Get response message, to the initial AMF 120*a*. In an embodiment, the Nnssf_NSSelection_Get response message may include one or more of the following information:

- Information indicating the target AMF set (e.g., target AMF set ID),
- Encryption information (e.g., public key) for the target AMF set, or
- Token issued by the NSSF 175

In an embodiment, the public key of the target AMF set may be a public key allocated to the target AMF set to which the target AMF 120*b* belongs among the public keys allocated to the AMF sets described in pre-configuration 1 A1, and information about the public keys may be previously shared with the NSSF 175. In an embodiment, when the NSSF 175 receives the parameter for requesting the public key of the target AMF set from the initial AMF 120*a* through the message of step 206*a*, the NSSF 175 may include the public key of the target AMF set in the message of step 206*b* and may send the message to the initial AMF 120*a*. In an embodiment, if the NSSF 175 receives the message in step 206*a*, the NSSF 175 may determine whether it is necessary to send the public key of the target AMF set to the initial AMF 120*a* by itself, and then may include the public key of the target AMF set in the message in step 206*b* and send the message to the initial AMF 120*a* according to the result.

The token issued by the NSSF may include a value verifiable by AMFs belonging to the target AMF set using a pre-shared credential, as described in pre-configuration 2 A2. In an embodiment, when receiving a parameter for requesting a token issued by the NSSF 175 from the initial AMF 120*a* through the message in step 206*a*, the NSSF 175 may issue the token and may send the token to the initial AMF 120*a* through the message in step 206*b*. In an embodiment, when the NSSF 175 receives the message in step 206*a*, the NSSF 175 may determine whether it is necessary to send the token issued by the NSSF 175 to the initial AMF 120*a* on its own, issue the token according to the result thereof, and send the token to the initial AMF 120*a* through the message in step 206*b*.

In an embodiment, the token issued by the NSSF 175 may include one or more of the following information.

Issuer: Information that may denote the NSSF 175 (e.g., at least one of ID, address, or name, hereinafter referred to as ID/address/name)

Subject: Information (name, ID, or address) that may denote the initial AMF 120*a* or the AMF set to which the initial AMF 120*a* belongs.

Audience: Information (name, ID, or address) that may denote the target AMF 120*b* or the target AMF set.

Service name: Purpose of using the token. As an example, it may include a factor specifying that it is a token issued for AMF reallocation.

Time Info: Time Information related to token. For example, it may include at least one of the time when the token is issued, the time interval when the token is valid, and the time when the token expires.

'Electronic signature and/or message authentication code (MAC)' generated by the NSSF 175 for all and/or some of the above-described information Hereinafter, other embodiments of steps 206*a* and 206*b* are described.

In steps 206*a* and 206*b* described above, the initial AMF 120*a* and the NSSF 175 exchange information through one request-response pair for ease of description, but in an embodiment, the operation in which the initial AMF 120*a* and the NSSF 175 exchange the information may be implemented through one or more request-response pairs. For example, the initial AMF 120*a* and the NSSF 175 may exchange the above-described information while exchanging one or more pairs of request and response messages (e.g., Nnssf_NSSelection_Get and Nnssf_NSSelection_Get response).

As an embodiment, operations in which the initial AMF 120*a* and the NSSF 175 exchange the above-described information through two request-response pairs are described below. In an embodiment, the first request-response process and the second request-response process may be performed immediately one after the other, or any other operation may be added between the first request-response process and the second request-response.

[1] The initial AMF 120*a* may transmit a request message for slice selection, e.g., Nnssf_NSSelection_Get message, to the NSSF 175 (e.g., step 206*a*). In an embodiment, the Nnssf_NSSelection_Get message may include one or more of the following information:

Information indicating network slices requested by the UE 110 (e.g., requested NSSAI(s)), Information indicating network slices allowed to be used by the UE 110 (e.g., allowed NSSAI(s)), or Information related to the UE 110 (e.g., PLMN ID of SUPI identifying the UE 110)

[2] The NSSF 175 may provide a response message including "information of the AMF to be reallocated", e.g., the Nnssf_NSSelection_Get response message, to the initial AMF 120*a* (e.g., step 206*b*). In an embodiment, the Nnssf_NSSelection_Get response message may include the following information:

Information indicating the target AMF set (e.g., target AMF set ID),

[3] The initial AMF 120*a* may transmit a message requesting encryption information of the target AMF set (e.g., a public key of the target AMF set) and/or a token issued by the NSSF 175 to the NSSF 175. In this case, the message sent by the initial AMF 120*a* may include one or more of the following information.

Target AMF set ID

Parameter requesting encryption information (e.g., public key of target AMF set) for target AMF set Parameter requesting token issued by the NSSF 175

[4] In response to the message requesting the token, the NSSF 175 may transmit a message including one or more of the following information to the initial AMF 120*a*.

Encryption information for target AMF set, or

Token issued by the NSSF 175

In an embodiment, when the encryption information for the target AMF set is the public key of the target AMF set, the public key of the target AMF set may be a public key allocated to the target AMF set to which the target AMF 120*b* belongs among the public keys allocated to the AMF sets described in pre-configuration 1 A1, and information about the public keys may be previously shared with the NSSF 175. In an embodiment, when the NSSF 175 receives a parameter for requesting encryption information of the target AMF set from the initial AMF 120*a* through the message in step [3], the NSSF 175 may include the encryption information of the target AMF set in the message in step [4] and may send the message to the initial AMF 120*a*. In an embodiment, if the NSSF 175 receives the message in step [3], the NSSF 175 may determine whether it is necessary to send the encryption information of the target AMF set to the initial AMF 120*a* by itself, and then may include the encryption information of the target AMF set in the message in step [4] and send the message to the initial AMF 120*a* according to the result.

In an embodiment, the token issued by the NSSF 175 may be a value verifiable by AMFs belonging to the target AMF set using a pre-shared credential, as described in pre-configuration 2 A2. In an embodiment, when receiving a parameter for requesting a token issued by the NSSF 175 from the initial AMF 120*a* through the message in step [3], the NSSF 175 may issue the token and may send the token to the initial AMF 120*a* through the message in step [4]. In an embodiment, when the NSSF 175 receives the message in step [3], the NSSF 175 may determine whether it is necessary to send the token issued by the NSSF 175 to the initial AMF 120*a* on its own, issue the token according to the result thereof, and send the token to the initial AMF 120*a* through the message in step [4].

In an embodiment, for a description of the token issued by the NSSF 175, a reference may be made to what has been described in step 206*b* above.

In the above-described embodiment, e.g., an operation in which the initial AMF 120*a* and the NSSF 175 exchange the information through two request-response pairs has been described, but the operation in which the initial AMF 120*a* and the NSSF 175 exchange the described information does not need to be limited to the above-described steps. It should be noted that the operation in which the initial AMF 120*a* and the NSSF 175 exchange the information is not limited to the procedures described herein. For example, an operation in which the initial AMF 120*a* and the NSSF 175 exchange the above-described information may be implemented through one or more "request-response" operation pairs. When a plurality of 'request-response' operation pairs are implemented, other steps not described herein may be performed between the 'request and response' of each pair as necessary.

In step 207, the initial AMF 120*a* may generate an encrypted NAS security context container. Although not shown, step 207 in an embodiment may include some and/or all of the following steps 207-1 to 207-4.

In step 207-1, the initial AMF 120*a* may identify a NAS security context (NAS SC) to be sent to the target AMF 120*b*. In an embodiment, the NAS security context may be the same as the NAS security context formed between the UE 110 and the initial AMF 120*a* through steps 201 to 204. In an embodiment, the NAS security context may be a new NAS security context derived from the NAS security context formed between the UE 110 and the initial AMF 120*a* through steps 201 to 204.

In step 207-2, the initial AMF 120*a* may configure a NAS security context container to be sent to the target AMF 120*b*. In an embodiment, the NAS security context container may include the NAS security context prepared in step 207-1. In an embodiment, when the NAS security context is a new NAS security context derived from the NAS security context formed through steps 201 to 204, a parameter (e.g., 'DeriviationInd') indicating that the new NAS security context is included may be further included in the NAS security context container.

In step 207-3, the initial AMF 120*a* may obtain a public key of the target AMF set to be used in the encryption process. In an embodiment, the public key of the target AMF set may be received from the NSSF 175 in step 206*b*. In an embodiment, the public key of the target AMF set may be obtained from information previously stored in the initial AMF 120*a*.

In step 207-4, the initial AMF 120*a* may generate an encrypted NAS security context container using one of the following methods M1, M2, and M3.

(M1) Method 1

- The initial AMF 120*a* may generate the encrypted NAS security context container by encrypting the NAS security context container prepared in step 207-2 using the public key prepared in step 207-3.
- Additional information may not be generated.

(M2) Method 2

- The initial AMF 120*a* may generate a protection key (e.g., a symmetric key) to encrypt the NAS security context container, and generate the encrypted NAS security context container by encrypting the NAS security context container prepared in step 207-2 using the protection key.
- The initial AMF 120*a* may encrypt the protection key using the public key prepared in 207-3, and generate additional information including the encrypted value.

(M3) Method 3

- The initial AMF 120*a* may generate an asymmetric key pair (e.g., including the public key ePK and the secret key eSK). The initial AMF 120*a* may generate a protection key to encrypt the NAS security context container using the generated secret key eSK and the public key prepared in step 207-3 as materials of a key exchange algorithm (e.g., a Diffie-Hellman method). The initial AMF 120*a* may generate the encrypted NAS security context container by encrypting the NAS security context container prepared in step 207-2 using the protection key.

In an embodiment, the initial AMF 120*a* may additionally generate an integrity protection key using the generated secret key eSK and the public key prepared in step 207-3 as materials of the key exchange algorithm and then generate a value (e.g., a MAC tag value) for ensuring the integrity of the encrypted NAS security context container (or NAS security context container) using the integrity protection key, and include the value in the encrypted NAS security context container.

- The initial AMF 120*a* may generate additional information including the public key ePK.

According to various embodiments as described above, in step 207, the initial AMF 120*a* may generate an "encrypted NAS security context container and additional information" to be sent to the target AMF 120*b*.

In step 208*a*, the initial AMF 120*a* may transmit a reroute NAS message to the RAN 115. The reroute NAS message may include one or more of the following information.

- Registration request (RR) message received from the UE 110 in step 201
- Information indicating the target AMF set (e.g., ID/address/name)
- 'Encrypted NAS security context container and additional information' generated in step 207
- Token obtained in step 206*b*

In step 208*b*, the RAN 115 may transmit an initial UE message including some and/or all of the information received through the message in step 208*a* to the target AMF 120*b*.

In an embodiment, the RAN 115 may identify the AMF set (i.e., the target AMF set) intended by the initial AMF 120*a* using the information indicating the target AMF set received through the message in step 208*a* and then select one of the AMFs belonging to the AMF set, and may determine the selected AMF as the target AMF 120*b*.

In an embodiment, the message in step 208*b* transmitted by the RAN 115 to the target AMF 120*b* may include one or more of the following information.

- Registration request (RR) message received from the UE 110 in step 208*a*
- Information indicating the target AMF set (or target AMF 120*b*) received in step 208*a*
- 'Encrypted NAS security context container and its corresponding additional information' received in step 208*a*
- Token received in step 208*a*

Although not shown, in an embodiment, step 209 may include one or more of the following steps 209-1 and 209-2.

In step 209-1, when the token is included in the message in step 208*b*, the target AMF 120*b* may verify the validity of the token.

In an embodiment, the target AMF 120*b* may verify the validity of the token using a "credential capable of verifying the token issued by the NSSF" (e.g., refer to the description of pre-configuration 2 (A2)) previously held. In an embodiment, the target AMF 120*b* may verify the validity of the 'electronic signature and/or MAC generated by the NSSF' included in the token.

In an embodiment, the target AMF 120*b* may additionally perform one or more of the following verification operations for the token.

The target AMF 120*b* may identify the Issuer item included in the token.

Accordingly, the target AMF 120*b* may verify that the token is generated from the reliable NSSF 175.

The target AMF 120*b* may identify the Subject item included in the token to identify the initial AMF 120*a* that has sent the encrypted NAS security context and/or the AMF set to which the initial AMF 120*a* belongs.

The target AMF 120*b* may identify the Audience item included in the token to identify whether the information about the AMF set written on the item corresponds to the AMF set to which the target AMF 120*b* belongs.

The target AMF 120*b* may identify the Time Info item included in the token to identify whether the token is valid at the current time point. included in the token.

In step 209-2, the target AMF 120*b* may decrypt the encrypted NAS security context container using one of the following methods M1, M2, and M3. (M1) to (M3) described below may be mapped in the same order as (M1) to (M3) described in step 207 above.

(M1) Method 1

The target AMF 120*b* may obtain the NAS security context container transmitted by the initial AMF 120*a* by decrypting the encrypted NAS security context container using the secret key allocated to the AMF set (target AMF set) to which the target AMF 120*b* belongs.

(M2) Method 2

The target AMF 120*b* may obtain the protection key by decrypting the additional information included in the message in step 208*b* using the secret key allocated to the AMF set (target AMF set) to which the target AMF 120*b* belongs. The target AMF 120*b* may obtain the NAS security context container transmitted by the initial AMF 120*a* by decrypting the encrypted NAS security context container using the protection key.

(M3) Method 3

The target AMF 120*b* may generate the protection key using the secret key allocated to the AMF set (target AMF set) to which the target AMF 120*b* belongs and the public key (e.g., ePK) of the initial AMF 120*a* obtained from the additional information as materials of the key exchange algorithm (in an embodiment, the same key exchange algorithm as that used in method 3 (M3) of step 207). The target AMF 120*b* may obtain the NAS security context container transmitted by the initial AMF 120*a* by decrypting the encrypted NAS security context container using the protection key.

In an embodiment, the target AMF 120*b* may additionally generate an integrity protection key using the secret key allocated to the AMF set to which the target AMF 120*b* belongs and the public key ePK of the initial AMF 120*a* obtained from the additional information as materials of the key exchange algorithm, and may verify the integrity of the value (e.g., a MAC tag value) that guarantees integrity included in the encrypted NAS security context container using the integrity protection key.

Through various embodiments as described above, the target AMF 120*b* may obtain the NAS security context container in step 209. In an embodiment, when the NAS security context container includes a "new NAS security context derived in step 207-1", step 210 may be additionally performed. For example, the target AMF 120*b* may identify that the obtained NAS security context is a new security context by identifying that the NAS security context container includes a "parameter (e.g., DeriviationInd) indicating that the new NAS security context is included".

In step 210, the UE 110 and the target AMF 120*b* may perform a security mode command (SMC) procedure for generating keys to be used for future secure communication between the UE 110 and the target AMF 120*b* based on the security context formed through the operations.

Through steps 209 to 210, a security context is formed between the UE 110 and the target AMF 120*b*. For example, encryption keys to be used for secure communication may be shared between the UE 110 and the target AMF 120*b*. Thereafter, if necessary, the UE 110 and the target AMF 120*b* may perform a series of operations for completing the registration procedure.

For example, in an embodiment, the UE 110 and the target AMF 120*b* may perform the primary authentication procedure described in step 203, and may once again perform steps corresponding to step 210 in order to share a newly formed security context with each other and generate keys to be used for secure communication as a result of the authentication procedure.

Figure 3:
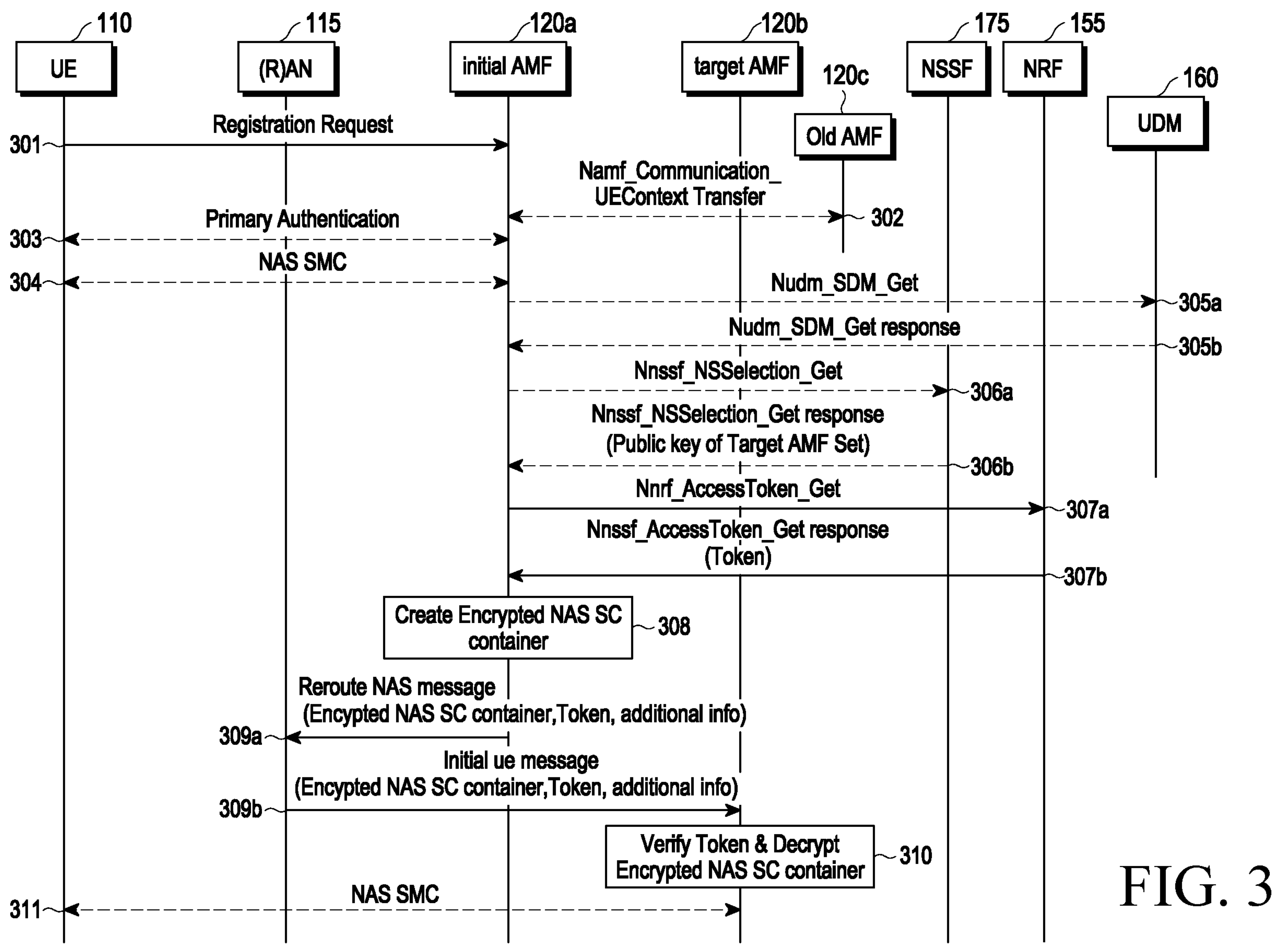
FIG. 3 is a view illustrating an example AMF reallocation procedure according to various embodiments of the disclosure.

FIG. 3 is a view illustrating an example AMF reallocation procedure according to various embodiments of the disclosure. Various embodiments may be implemented, including at least one of the steps described below.

For the procedure disclosed in FIG. 3, one or more of the following configurations may be performed in advance.

(A1) Pre-Configuration 1

All AMFs present in the communication network may be constituted of one or more AMF sets, and each AMF set may be constituted of one or more AMFs. In this case, an asymmetric key pair for AMF reallocation (including a public key and a secret key) may be assigned to each AMF set, and AMFs belonging to one AMF set may have the corresponding public key and/or secret key.

(A1) Pre-Configuration 2

A credential that may verify the token issued by the NRF 155 may be shared with the target AMF 120*b*. For example, the target AMF 120*b* may have, as an example of the credential, the public key of the NRF 155 for verifying the electronic signature of the NRF 155 or information associated with the public key (e.g., which may include an address for obtaining the public key of the NRF 155) or an encryption key for verifying the MAC generated by the NRF 155 (or the shared secret for deriving the encryption key).

Referring to FIG. 3, in step 301, the UE 110 may transmit a registration request (RR) message to the initial AMF 120*a* through the RAN (e.g., base station) 115. In an embodiment, the registration request message may include information for identifying the UE 110 (e.g., 5G-GUTI or SUCI). In an embodiment, the registration request message may further include network slicing information (e.g., requested NSSAI(s)) indicating the network slice(s) requested by the UE 110.

In an embodiment, if SUCI is included in the registration request message in step 301, step 302 may be omitted.

In an embodiment, if the registration request message in step 301 includes a 5G-GUTI, but there is no connection between the initial AMF 120*a* and the old AMF 120*c* (e.g., the AMF associated with the 5G-GUTI), step 302 may be omitted.

In an embodiment, if the registration request message in step 301 includes the 5G-GUTI and there is a connection between the initial AMF 120*a* and the old AMF 120*c* (e.g., the AMF associated with the 5G-GUTI), in step 302, the initial AMF 120*a* may transmit an Namf_Communication_UEContext Transfer message for requesting the transfer of the UE context to the old AMF 120*c*, and may receive a response including the UE context from the old AMF 120*c*. The UE context may include a security context established between the old AMF 120*c* and the UE 110. The security context may include security information that has been shared between the old AMF 120*c* and the UE 110 (including, e.g., at least one of a root key that has been shared between the old AMF 120*c* and the UE 110 or a key for encryption/integrity protection derived from the root key).

In an embodiment, the old AMF 120*c* may transmit the security context between the old AMF 120*c* and the UE 110 as it is in step 302. In an embodiment, the old AMF 120*c* may derive a new security context using the security context used between the old AMF 120*c* and the UE 110 in step 302 (including, e.g., an operation of deriving a new key using horizontal key derivation and then generating a new security context including the new key) and then transmit the new security context to the initial AMF 120*a*.

In step 303, primary authentication may be performed between the UE 110 and the initial AMF 120*a*. Through the primary authentication, the UE 110 and the initial AMF 120*a* may authenticate each other. Through the primary authentication, the UE 110 and the initial AMF 120*a* may share a security context to be used for future encryption communication with each other.

In an embodiment, step 303 may be performed when the SUCI is included in the registration request message of step 301. In an embodiment, step 303 may be performed when 5G-GUTI is included in the registration request message of step 301 but there is no connection between the initial AMF 120*a* and the old AMF 120*c*, or when the initial AMF 120*a* fails to properly obtain the security context formed between the UE 110 and the old AMF 120*c* from the old AMF 120*c* although there is a connection between the initial AMF 120*a* and the old AMF 120*c*.

In step 304, the UE 110 and the initial AMF 120*a* may perform an SMC procedure for generating security information (e.g., including keys) to be used for secure communication between the UE 110 and the initial AMF 120*a*.

In an embodiment, step 304 may be performed when step 303 is performed, e.g., when primary authentication is performed between the UE 110 and the initial AMF 120*a* and the security context is shared. In an embodiment, step 304 may be performed when the old AMF 120*c* derives a new security context and provides the new security context to the initial AMF 120*a* in step 302.

Through steps 302 to 304, a security context may be formed between the UE 110 and the initial AMF 120*a*. For example, encryption keys to be used for secure communication may be shared between the UE 110 and the initial AMF 120*a*. After step 304, when an unprotected message is received using at least one of the security context or the encryption keys, the UE 110 may reject the received message.

In an embodiment, the initial AMF 120*a* may perform the following steps 305*a* and 305*b* to obtain subscription information of the UE 110 for determining whether to reallocate the AMF from the UDM 160.

In step 305*a*, the initial AMF 120*a* may transmit an Nudm_SDM_Get message for requesting subscription information of the UE 110 to the UDM 160. In an embodiment, although not disclosed in the drawings, the UDM 160 may obtain the subscription information from the UDR.

In step 305*b*, the UDM 160 may include the requested subscription information of the UE 110 in an Nudm_SDM_Get response message, and may transmit the response message to the initial AMF 120*a*.

In an embodiment, when it is determined that the initial AMF 120*a* is no longer capable of serving the UE 110 (for example, when the initial AMF 120*a* does not support all network slices requested by the UE 110 through the registration request message), the following steps 306*a* and 306*b* may be performed.

In step 306*a*, the initial AMF 120*a* may transmit a Nnssf_NSSelection_Get message for requesting "information of the AMF to be reallocated" to the NSSF 175. In an embodiment, the Nnssf_NSSelection_Get message may include one or more of the following information:

Information indicating network slices requested by the UE 110 (e.g., requested NSSAI(s)), Information indicating network slices allowed to be used by the UE 110 (e.g., allowed NSSAI(s)), Information related to the UE 110 (e.g., PLMN ID of SUPI identifying the UE 110)

In an embodiment, the Nnssf_NSSelection_Get message may further include a parameter for requesting a public key of the target AMF 120*b* (or the target AMF set).

In step 306*b*, the NSSF 175 may provide the Nnssf_NSSelection_Get response message including "information of the AMF to be reallocated" to the initial AMF 120*a*. In an embodiment, the Nnssf_NSSelection_Get response message may include one or more of the following information:

Information indicating the target AMF set (e.g., target AMF set ID)

Public key of the target AMF set

In an embodiment, the public key of the target AMF set may be a public key allocated to the target AMF set to which the target AMF 120*b* belongs among the public keys allocated to the AMF sets described in pre-configuration 1 A1, and information about the public keys may be previously shared with the NSSF 175. In an embodiment, when the NSSF 175 receives the parameter for requesting the public key of the target AMF set from the initial AMF 120*a* through the message of step 306*a*, the NSSF 175 may include the public key of the target AMF set in the message of step 306*b* and may send the message to the initial AMF 120*a*. In an embodiment, if the NSSF 175 receives the message in step 306*a*, the NSSF 175 may determine whether it is necessary to send the public key of the target AMF set to the initial AMF 120*a* by itself, and then may include the public key of the target AMF set in the message in step 306*b* and send the message to the initial AMF 120*a* according to the result.

Hereinafter, other embodiments of steps 306*a* and 306*b* are described.

In steps 306*a* and 306*b* described above, the initial AMF 120*a* and the NSSF 175 exchange information through one request-response pair for ease of description, but in an embodiment, the operation in which the initial AMF 120*a* and the NSSF 175 exchange the information may include one or more request-response pairs. For example, the initial AMF 120*a* and the NSSF 175 may exchange the above-described information while exchanging one or more request-response pairs (e.g., Nnssf_NSSelection_Get and Nnssf_NSSelection_Get response).

As an embodiment, the operation in which the initial AMF 120*a* and the NSSF 175 exchange the above-described information through two request-response pairs is described below. In an embodiment, the first request-response process and the second request-response process may be performed immediately one after the other, or any other operation may be added between the first request-response process and the second request-response.

[1] The initial AMF 120*a* may transmit an Nnssf_NSSelection_Get message for requesting slice selection to the NSSF 175 (e.g., step 306*a*). In an embodiment, the Nnssf_NSSelection_Get message may include one or more of the following information:

Information indicating network slices requested by the UE 110 (e.g., requested NSSAI(s)), Information indicating network slices allowed to be used by the UE 110 (e.g., allowed NSSAI(s)), or Information related to the UE 110 (e.g., PLMN ID of SUPI identifying the UE 110)

[2] The NSSF 175 may provide the Nnssf_NSSelection_Get response message including "information of the AMF to be reallocated" to the initial AMF 120*a* (e.g., step 306*b*). In an embodiment, the Nnssf_NSSelection_Get response message may include the following information:

Information indicating the target AMF set (e.g., target AMF set ID),

[3] The initial AMF 120*a* may transmit a message requesting encryption information of the target AMF set (e.g., a public key of the target AMF set) to the NSSF 175. In this case, the message sent by the initial AMF 120*a* may include one or more of the following information.

Target AMF set ID, or

Parameter requesting encryption information (e.g., public key of target AMF set) for target AMF set

[4] The NSSF 175 may transmit a message including the following information to the initial AMF 120*a* in response to the message requesting the encryption information.

Encryption information for target AMF set

In an embodiment, when the encryption information for the target AMF set is the public key of the target AMF set, the public key of the target AMF set may be a public key allocated to the target AMF set to which the target AMF 120*b* belongs among the public keys allocated to the AMF sets described in pre-configuration 1 A1, and information about the public keys may be previously shared with the NSSF 175. In an embodiment, when the NSSF 175 receives a parameter for requesting encryption information of the target AMF set from the initial AMF 120*a* through the message in step [3], the NSSF 175 may include the encryption information of the target AMF set in the message in step [4] and may send the message to the initial AMF 120*a*. In an embodiment, if the NSSF 175 receives the message in step [3], the NSSF 175 may determine whether it is necessary to send the encryption information of the target AMF set to the initial AMF 120*a* by itself, and then may include the encryption information of the target AMF set in the message in step [4] and send the message to the initial AMF 120*a* according to the result.

In the above-described embodiment, e.g., an operation in which the initial AMF 120*a* and the NSSF 175 exchange the information through two request-response pairs has been described, but the operation in which the initial AMF 120*a* and the NSSF 175 exchange the described information does not need to be limited to the above-described steps. It should be noted that the process in which the initial AMF 120*a* and the NSSF 175 exchange the information is not limited to the procedures described herein. For example, an operation in which the initial AMF 120*a* and the NSSF 175 exchange the above-described information may be implemented through one or more "request-response" pairs. When a plurality of 'request-response' operation pairs are implemented, other steps not described herein may be performed between the 'request and response' of each pair as necessary.

In step 307*a*, the initial AMF 120*a* may transmit, to the NRF 155, a request message for requesting a 'token issued by the NRF', e.g., the Nnrf_AccessToken_Get message. The Nnrf_AccessToken_Get message may include a parameter for requesting a token issued by the NRF 155. In an embodiment, the Nnrf_AccessToken_Get message may include information (e.g., ID/address/name) indicating the target AMF set. In an embodiment, the Nnrf_AccessToken_Get message may include information and/or a parameter indicating that the purpose of requesting the token is related to AMF reallocation.

In step 307*b*, the NRF 155 may transmit an Nnrf_AccessToken_Get response message including "a token issued by the NRF 155" to the initial AMF 120*a*.

In an embodiment, the token issued by the NRF 155 may include a value verifiable by AMFs belonging to the target AMF set using a pre-shared credential, as described in pre-configuration 2 A2. In an embodiment, when receiving a parameter for requesting a token from the initial AMF 120*a* through the message in step 307*a*, the NRF 155 may issue the token and may send the token to the initial AMF 120*a* through the message in step 307*b*. In an embodiment, when the NSSF 175 receives the message in step 307*a*, the NSSF 175 may determine whether it is necessary to send the token to the initial AMF 120*a* on its own, issue the token according to the result thereof, and send the token to the initial AMF 120*a* through the message in step 307*b*.

In an embodiment, the token issued by the NRF 155 may include one or more of the following information.

Issuer: Information that may denote the NRF 155 (e.g., ID/address/name)

Subject: Information (e.g., name/ID/address) that may denote the initial AMF 120*a* or the AMF set to which the initial AMF 120*a* belongs.

Audience: Information (e.g., at least one of name, ID, or address) that may denote the target AMF 120*b* or the target AMF set.

Service name: Purpose of using the token. As an example, it may include a factor specifying that it is a token issued for AMF reallocation.

Time Info: Time Information related to token. For example, it may include at least one of the time when the token is issued, the time interval when the token is valid, and the time when the token expires.

'Electronic signature and/or MAC' generated by the NRF 155 for all and/or some of the above-described information In step 308, the initial AMF 120*a* may generate an encrypted NAS security context container. Although not shown, step 308 in an embodiment may include some and/or all of the following steps 308-1 to 308-4.

In step 308-1, the initial AMF 120*a* may identify a NAS security context (NAS SC) to be sent to the target AMF 120*b*. In an embodiment, the NAS security context may be the same as the NAS security context formed between the UE 110 and the initial AMF 120*a* through steps 301 to 304.

In an embodiment, the NAS security context may be a new NAS security context derived from the NAS security context formed between the UE 110 and the initial AMF 120*a* through steps 301 to 304.

In step 308-2, the initial AMF 120*a* may configure a NAS security context container to be sent to the target AMF 120*b* (or target AMF set or group). In an embodiment, the NAS security context container may include the NAS security context prepared in step 308-1. In an embodiment, when the NAS security context is a new NAS security context derived from the NAS security context formed through steps 301 to 304, a parameter (e.g., 'DeriviationInd') indicating that the new NAS security context is included may be further included in the NAS security context container.

In step 308-3, the initial AMF 120*a* may obtain a public key of the target AMF set to be used in the encryption process. In an embodiment, the public key of the target AMF set may be received from the NSSF 175 in step 306*b*. In an embodiment, the public key of the target AMF set may be obtained from information previously stored in the initial AMF 120*a*.

In step 308-4, the initial AMF 120*a* may generate an encrypted NAS security context container using one of the following methods M1, M2, and M3.

(M1) Method 1

The initial AMF 120*a* may generate the encrypted NAS security context container by encrypting the NAS security context container prepared in step 308-2 using the public key prepared in step 308-3.

Additional information may not be generated.

(M2) Method 2

The initial AMF 120*a* may generate a protection key (e.g., a symmetric key) to encrypt the NAS security context container, and generate the encrypted NAS security context container by encrypting the NAS security context container prepared in step 308-2 using the protection key.

The initial AMF 120*a* may encrypt the protection key using the public key prepared in step 308-3, and generate additional information including the encrypted value.

(M3) Method 3

The initial AMF 120*a* may generate an asymmetric key pair (e.g., including the public key ePK and the secret key eSK). The initial AMF 120*a* may generate a protection key to encrypt the NAS security context container using the generated secret key eSK and the public key obtained in step 308-3 as materials of a key exchange algorithm (e.g., a Diffie-Hellman method). The initial AMF 120*a* may generate the encrypted NAS security context container by encrypting the NAS security context container generated in step 308-2 using the protection key.

In an embodiment, the initial AMF 120*a* may generate an integrity protection key using the generated secret key eSK and the public key prepared in step 308-3 as materials of the key exchange algorithm and then generate a value (e.g., a MAC tag value) for ensuring the integrity of the encrypted NAS security context container (or NAS security context container) using the integrity protection key, and include the value in the encrypted NAS security context container.

The initial AMF 120*a* may generate additional information including the public key ePK.

According to various embodiments as described above, in step 308, the initial AMF 120*a* may generate an "encrypted NAS security context container and additional information" to be sent to the target AMF 120*b*.

In step 309*a*, the initial AMF 120*a* may transmit a reroute NAS message to the RAN 115. The reroute NAS message may include one or more of the following information.

Registration request (RR) message received from the UE 110 in step 301

Information indicating the target AMF set (e.g., name/ID/address)

'Encrypted NAS security context container and additional information' generated in step 308

Token obtained in step 307*b*

In step 309*b*, the RAN 115 may transmit an initial UE message including some and/or all of the information received through the message in step 309*a* to the target AMF 120*b*.

In an embodiment, the RAN 115 may identify the AMF set (i.e., the target AMF set) intended by the initial AMF 120*a* using the information indicating the target AMF set received through the message in step 309*a* and then select one of the AMFs belonging to the AMF set, and may determine the selected AMF as the target AMF 120*b*.

In an embodiment, the message in step 309*b* transmitted by the RAN 115 to the target AMF 120*b* may include one or more of the following information.

Registration request (RR) message received from the UE 110 in step 309*a*

Information indicating the target AMF set (or target AMF 120*b*) received in step 309*a*

'Encrypted NAS security context container and its corresponding additional information' received in step 309*a*

Token received in step 309*a*

Although not shown, in an embodiment, step 310 may include one or more of the following steps 310-1 and 310-2.

In step 310-1, when the token is included in the message in step 309*b*, the target AMF 120*b* may verify the validity of the token. In an embodiment, the target AMF 120*b* may verify the validity of the token using a "credential capable of verifying the token issued by the NRF" (e.g., refer to the description of pre-configuration 2 (A2)) previously held. In an embodiment, the target AMF 120*b* may verify the validity of the 'electronic signature and/or MAC generated by the NRF' included in the token.

In an embodiment, the target AMF 120*b* may additionally perform one or more of the following verification operations for the token.

The target AMF 120*b* may identify the Issuer item included in the token. Accordingly, the target AMF 120*b* may verify that the token is generated from the reliable NRF 155.

The target AMF 120*b* may identify the initial AMF 120*a* that has sent the encrypted NAS security context and/or the AMF set to which the initial AMF 120*a* belongs based on the Subject item included in the token.

The target AMF 120*b* may identify the Audience item included in the token to identify whether the information about the AMF set written on the item corresponds to the AMF set to which the target AMF 120*b* belongs.

The target AMF 120*b* may identify the Time Info item included in the token to identify whether the token is valid at the current time point. included in the token.

In step 310-2, the target AMF 120*b* may decrypt the encrypted NAS security context container using one of the following methods M1, M2, and M3. (M1) to (M3) described below may be mapped in the same order as (M1) to (M3) described in step 308 above.

(M1) Method 1

The target AMF 120*b* may obtain the NAS security context container by decrypting the encrypted NAS security context container using the secret key allocated to the AMF set to which the target AMF 120*b* belongs.

(M2) Method 2

The target AMF 120*b* may obtain the protection key by decrypting the additional information included in the message in step 309*b* using the secret key allocated to the AMF set (target AMF set) to which the target AMF 120*b* belongs. The target AMF 120*b* may obtain the NAS security context container transmitted by the initial AMF 120*a* by decrypting the encrypted NAS security context container using the protection key.

(M3) Method 3

The target AMF 120*b* may generate the protection key using the secret key allocated to the AMF set (target AMF set) to which the target AMF 120*b* belongs and the public key (e.g., ePK) of the initial AMF 120*a* obtained from the additional information as materials of the key exchange algorithm (in an embodiment, the same key exchange algorithm as that used in method 3 (M3) of step 308). The target AMF 120*b* may obtain the NAS security context container transmitted by the initial AMF 120*a* by decrypting the encrypted NAS security context container using the protection key.

In an embodiment, the target AMF 120*b* may additionally generate an integrity protection key using the secret key allocated to the AMF set to which the target AMF 120*b* belongs and the public key ePK of the initial AMF 120*a* obtained from the additional information as materials of the key exchange algorithm, and may verify the integrity of the value (e.g., a MAC tag value) that guarantees integrity included in the encrypted NAS security context container using the integrity protection key.

Through various embodiments as described above, the target AMF 120*b* may obtain the NAS security context container in step 310. In an embodiment, when the NAS security context container includes a "new NAS security context derived in step 308-1", step 311 may be additionally performed. For example, the target AMF 120*b* may identify that the obtained NAS security context is a new security context by identifying that the NAS security context container includes a "parameter (e.g., DeriviationInd) indicating that the new NAS security context is included".

In step 311, the UE 110 and the target AMF 120*b* may perform an SMC procedure for generating keys to be used for future secure communication between the UE 110 and the target AMF 120*b* based on the security context formed through the operations.

Through steps 310 to 311, a security context is formed between the UE 110 and the target AMF 120*b*. For example, encryption keys to be used for secure communication may be shared between the UE 110 and the target AMF 120*b*. Thereafter, if necessary, the UE 110 and the target AMF 120*b* may perform a series of operations for completing the registration procedure. In an embodiment, the UE 110 and the target AMF 120*b* may perform an authentication procedure, and may once again perform steps corresponding to step 311 in order to share a newly formed security context with each other and generate keys to be used for secure communication as a result of the authentication procedure.

Figure 4:
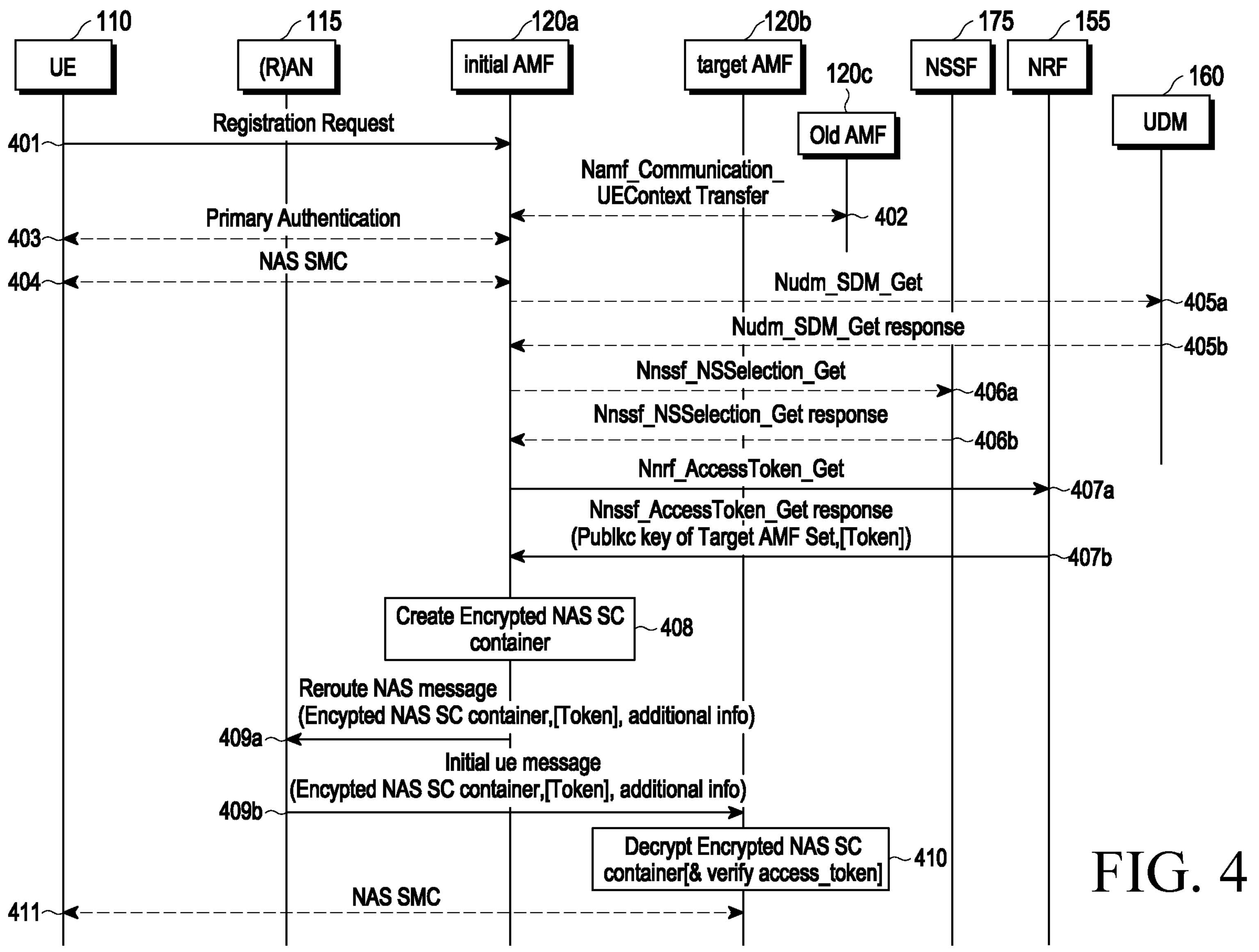
FIG. 4 is a view illustrating an example AMF reallocation procedure according to various embodiments of the disclosure.

FIG. 4 is a view illustrating an example AMF reallocation procedure according to various embodiments of the disclosure. Various embodiments may be implemented, including at least one of the steps described below.

For the procedure disclosed in FIG. 4, one or more of the following configurations may be performed in advance.

(A1) Pre-Configuration 1

The AMFs present in the communication network may be constituted of one or more AMF sets, and each AMF set may be constituted of one or more AMFs. In this case, an asymmetric key pair for AMF reallocation (e.g., including a public key and a secret key) may be assigned to each AMF set, and AMFs belonging to one AMF set may have the corresponding public key and/or secret key.

(A1) Pre-Configuration 2

Information (e.g., a credential) that may verify the token issued by the NRF 155 may be shared with the target AMF 120*b*. For example, the target AMF 120*b* may have, as an example of the information, the public key of the NRF 155 for verifying the electronic signature of the NRF 155 or information associated with the public key (e.g., which may include an address for obtaining the public key of the NRF 155) or an encryption key for verifying the MAC generated by the NRF 155 (or the shared secret for deriving the encryption key).

Referring to FIG. 4, in step 401, the UE 110 may transmit a registration request (RR) message to the initial AMF 120*a* through the RAN (e.g., base station) 115. In an embodiment, the registration request message may include information for identifying the UE 110 (e.g., 5G-GUTI or SUCI). In an embodiment, the registration request message may further include network slicing information (e.g., requested NSSAI(s)) indicating the network slice(s) requested by the UE 110.

In an embodiment, if SUCI is included in the registration request message in step 401, step 402 may be omitted.

In an embodiment, if the registration request message in step 401 includes a 5G-GUTI, but there is no connection between the initial AMF 120*a* and the old AMF 120*c* (e.g., the AMF associated with the 5G-GUTI), step 402 may be omitted.

In an embodiment, if the registration request message in step 401 includes the 5G-GUTI and there is a connection between the initial AMF 120*a* and the old AMF 120*c* (e.g., the AMF associated with the 5G-GUTI), in step 402, the initial AMF 120*a* may transmit an Namf_Communication_UEContext Transfer message for requesting the transfer of the UE context to the old AMF 120*c*, and may receive a response including the UE context from the old AMF 120*c*. For example, the UE context may include a security context established between the old AMF 120*c* and the UE 110. The security context may include security information that has been shared between the old AMF 120*c* and the UE 110 (including, e.g., at least one of a root key that has been shared between the old AMF 120*c* and the UE 110 or a key for encryption/integrity protection derived from the root key).

In an embodiment, the old AMF 120*c* may transmit the security context between the old AMF 120*c* and the UE 110 as it is in step 402. In an embodiment, the old AMF 120*c* may derive a new security context using the security context used between the old AMF 120*c* and the UE 110 in step 402 (including, e.g., an operation of deriving a new key using horizontal key derivation and then generating a new security context including the new key) and then transmit the new security context to the initial AMF 120*a*.

In step 403, primary authentication may be performed between the UE 110 and the initial AMF 120*a*. Through the primary authentication, the UE 110 and the initial AMF 120*a* may authenticate each other. Through the primary authentication, the UE 110 and the initial AMF 120*a* may share a security context to be used for future encryption communication with each other.

In an embodiment, step 403 may be performed when the SUCI is included in the registration request message of step 401. In an embodiment, step 403 may be performed when 5G-GUTI is included in the registration request message of step 402 but there is no connection between the initial AMF 120*a* and the old AMF 120*c*, or when the initial AMF 120*a* fails to properly obtain the security context formed between the UE 110 and the old AMF 120*c* from the old AMF 120*c* although there is a connection between the initial AMF 120*a* and the old AMF 120*c*.

In step 404, the UE 110 and the initial AMF 120*a* may perform an SMC procedure for generating security information (e.g., including keys) to be used for secure communication between the UE 110 and the initial AMF 120*a*.

In an embodiment, step 404 may be performed when step 403 is performed, e.g., when primary authentication is performed between the UE 110 and the initial AMF 120*a* and the security context is shared. In an embodiment, step 404 may be performed when the old AMF 120*c* derives a new security context and provides the new security context to the initial AMF 120*a* in step 402.

Through steps 402 to 404, a security context may be formed between the UE 110 and the initial AMF 120*a*. For example, encryption keys to be used for secure communication may be shared between the UE 110 and the initial AMF 120*a*. After step 404, when an unprotected message is received using at least one of the security context or the encryption keys, the UE 110 may reject the received message.

In an embodiment, the initial AMF 120*a* may perform the following steps 405*a* and 405*b* to obtain subscription information of the UE 110 for determining whether to reallocate the AMF from the UDM 160.

In step 405*a*, the initial AMF 120*a* may transmit an Nudm_SDM_Get message for requesting subscription information of the UE 110 to the UDM 160. In an embodiment, although not disclosed in the drawings, the UDM 160 may obtain the subscription information from the UDR.

In step 405*b*, the UDM 160 may include the requested subscription information of the UE 110 in an Nudm_SDM_Get response message, and may transmit the response message to the initial AMF 120*a*.

In an embodiment, when it is determined that the initial AMF 120*a* is no longer capable of serving the UE 110 (for example, when the initial AMF 120*a* does not support all network slices requested by the UE 110 through the registration request message), the following steps 406*a* and 406*b* may be performed.

In step 406*a*, the initial AMF 120*a* may transmit a Nnssf_NSSelection_Get message for requesting "information of the AMF to be reallocated" to the NSSF 175. In an embodiment, the Nnssf_NSSelection_Get message may include one or more of the following information:

- Information indicating network slices requested by the UE 110 (e.g., requested NSSAI(s)),
- Information indicating network slices allowed to be used by the UE 110 (e.g., allowed NSSIA(s)),
- Information related to the UE 110 (e.g., PLMN ID of SUPI indicating the UE 110)

In step 406*b*, the NSSF 175 may provide the Nnssf_NSSelection_Get response message including "information of the AMF to be reallocated" to the initial AMF 120*a*. In an embodiment, the Nnssf_NSSelection_Get response message may include the following information:

- Information indicating the target AMF set (e.g., target AMF set ID)

In step 407*a*, the initial AMF 120*a* may transmit, to the NRF 155, a request message for requesting a 'public key of the target AMF set' and/or 'token issued by the NRF', e.g., the Nnrf_AccessToken_Get message. The Nnrf_AccessToken_Get message may include the parameter for requesting the public key of the target AMF set. In an embodiment, the Nnrf_AccessToken_Get message may include a parameter for requesting a token issued by the NRF 155.

In an embodiment, the Nnrf_AccessToken_Get message initially sent by the AMF 120*a* to the NRF 155 may further include the following parameters.

- Information indicating the target AMF set (e.g., name/ID/address)
- Purpose of requesting a token (e.g., information or parameter indicating that a token is being requested for a task related to AMF reallocation).

In step 407*b*, the NRF 155 may transmit a response message including one or more of the following information, e.g., the Nnrf_AccessToken_Get response message, to the initial AMF 120*a*.

- Public key of the target AMF set
- Token issued by the NRF 155

The detailed description of the "public key of the target AMF set" and the "token issued by the NRF" may be as follows.

In an embodiment, the public key of the target AMF set may be a public key allocated to the target AMF set to which the target AMF 120*b* belongs among the public keys allocated to the AMF sets described in pre-configuration 1 A1, and information about the public keys may be previously shared with the NRF 155. In an embodiment, when the NRF 155 receives the parameter for requesting the public key of the target AMF set from the initial AMF 120*a* through the message of step 407*a*, the NSSF 175 may include the public key of the target AMF set in the message of step 407*b* and may send the message to the initial AMF 120*a*. In an embodiment, if the NRF 155 receives the message in step 407*a*, the NSSF 175 may determine whether it is necessary to send the public key of the target AMF set to the initial AMF 120*a* by itself, and then may include the public key of the target AMF set in the message in step 407*b* and send the message to the initial AMF 120*a* according to the result.

In an embodiment, the token issued by the NRF 155 may include a value verifiable by AMFs belonging to the target AMF set using a pre-shared information, as described in pre-configuration 2 A2. In an embodiment, when receiving a parameter for requesting a token issued by the NRF 155 from the initial AMF 120*a* through the message in step 407*a*, the NRF 155 may issue the token and may send the token to the initial AMF 120*a* through the message in step 407*b*. In an embodiment, when the NRF 155 receives the message in step 407*a*, the NRF 155 may determine whether it is necessary to send the token issued by the NSSF 175 to the initial AMF 120*a* on its own, issue the token according to the result thereof, and send the token to the initial AMF 120*a* through the message in step 407*b*.

In an embodiment, the token issued by the NRF 155 may include one or more of the following information.

- Issuer: Information that may denote the NRF 155 (e.g., name/ID/address)
- Subject: Information (e.g., name/ID/address) that may denote the initial AMF 120*a* or the AMF set to which the initial AMF 120*a* belongs.
- Audience: Information (e.g., name/ID/address) that may denote the target AMF 120*b* or the target AMF set.

Service name: Purpose of using the token. As an example, it may include a factor specifying that it is a token issued for AMF reallocation.

Time Info: Time Information related to token. For example, it may include at least one of the time when the token is issued, the time interval when the token is valid, and the time when the token expires.

'Electronic signature and/or MAC' generated by the NRF 155 for all and/or some of the above-described information In step 408, the initial AMF 120*a* may generate an encrypted NAS security context container. Although not shown, step 408 in an embodiment may include some and/or all of the following steps 408-1 to 408-4.

In step 408-1, the initial AMF 120*a* may identify a NAS security context (NAS SC) to be sent to the target AMF 120*b*. In an embodiment, the NAS security context may be the same as the NAS security context formed between the UE 110 and the initial AMF 120*a* through steps 401 to 404. In an embodiment, the NAS security context may be a new NAS security context derived from the NAS security context formed between the UE 110 and the initial AMF 120*a* through steps 401 to 404.

In step 408-2, the initial AMF 120*a* may configure a NAS security context container to be sent to the target AMF 120*b* (or target AMF set or group). In an embodiment, the NAS security context container may include the NAS security context prepared in step 408-1. In an embodiment, when the NAS security context is a new NAS security context derived from the NAS security context formed through steps 401 to 404, a parameter (e.g., 'DeriviationInd') indicating that the new NAS security context is included may be further included in the NAS security context container.

In step 408-3, the initial AMF 120*a* may obtain a public key of the target AMF set to be used in the encryption process. In an embodiment, the public key of the target AMF set may be received from the NRF 155 in step 407*b*. In an embodiment, the public key of the target AMF set may be obtained from information previously stored in the initial AMF 120*a*.

In step 408-4, the initial AMF 120*a* may generate an encrypted NAS security context container using one of the following methods M1, M2, and M3.

(M1) Method 1

The initial AMF 120*a* may generate the encrypted NAS security context container by encrypting the NAS security context container prepared in step 408-2 using the public key prepared in step 408-3.

Additional information may not be generated.

(M2) Method 2

The initial AMF 120*a* may generate a protection key (e.g., a symmetric key) to encrypt the NAS security context container, and generate the encrypted NAS security context container by encrypting the NAS security context container prepared in step 408-2 using the protection key.

The initial AMF 120*a* may encrypt the protection key using the public key prepared in step 408-3, and generate additional information including the encrypted value.

(M3) Method 3

The initial AMF 120*a* may generate an asymmetric key pair (e.g., including the public key ePK and the secret key eSK). The initial AMF 120*a* may generate a protection key to encrypt the NAS security context container using the generated secret key eSK and the public key obtained in step 408-3 as materials of a key exchange algorithm (e.g., a Diffie-Hellman method). The initial AMF 120*a* may generate the encrypted NAS security context container by encrypting the NAS SC container generated in step 408-2 using the protection key.

In an embodiment, the initial AMF 120*a* may generate an integrity protection key using the generated secret key eSK and the public key prepared in step 408-3 as materials of the key exchange algorithm and then generate a value (e.g., a MAC tag value) for ensuring the integrity of the encrypted NAS security context container (or NAS security context container) using the integrity protection key, and include the value in the encrypted NAS security context container.

The initial AMF 120*a* may generate additional information including the public key ePK.

According to various embodiments as described above, in step 408, the initial AMF 120*a* may generate an "encrypted NAS security context container and additional information" to be sent to the target AMF 120*b*.

In step 409*a*, the initial AMF 120*a* may transmit a reroute NAS message to the RAN 115. The reroute NAS message may include one or more of the following information.

Registration request (RR) message received from the UE 110 in step 401

Information indicating the target AMF set (e.g., name/ID/address)

'Encrypted NAS security context container and additional information' generated in step 408

Token obtained in step 407*b*

In step 309*b*, the RAN 115 may transmit an initial UE message including some and/or all of the information received through the message in step 409*b* to the target AMF 120*b*.

In an embodiment, the RAN 115 may identify the AMF set (i.e., the target AMF set) intended by the initial AMF 120*a* using the information indicating the target AMF set received through the message in step 409*a* and then select one of the AMFs belonging to the AMF set, and may determine the selected AMF as the target AMF 120*b*.

In an embodiment, the message in step 409*b* transmitted by the RAN 115 to the target AMF 120*b* may include one or more of the following information.

Registration request (RR) message received from the UE 110 in step 409*a*

Information indicating the target AMF set (or target AMF 120*b*) received in step 409*a*

'Encrypted NAS security context container and its corresponding additional information' received in step 409*a*

Token received in step 409*a*

Although not shown, in an embodiment, step 410 may include one or more of the following steps 410-1 and 410-2.

In step 410-1, when the token is included in the message in step 409*b*, the target AMF 120*b* may verify the validity of the token. In an embodiment, the target AMF 120*b* may verify the validity of the token using a "credential capable of verifying the token issued by the NRF" (e.g., refer to the description of pre-configuration 2 (A2)) previously held. In an embodiment, the target AMF 120*b* may verify the validity of the 'electronic signature and/or MAC generated by the NRF' included in the token.

In an embodiment, the target AMF 120*b* may additionally perform one or more of the following verification operations for the token.

The target AMF 120*b* may identify the Issuer item included in the token.

Accordingly, the target AMF 120*b* may verify that the token is generated from the reliable NRF 155.

The target AMF 120*b* may identify the Subject item included in the token to identify the initial AMF 120*a* that has sent the encrypted NAS security context and/or the AMF set to which the initial AMF 120*a* belongs.

The target AMF 120*b* may identify the Audience item included in the token to identify whether the information about the AMF set written on the item corresponds to the AMF set to which the target AMF 120*b* belongs.

The target AMF 120*b* may identify the Time Info item included in the token to identify whether the token is valid at the current time point. included in the token.

In step 410-2, the target AMF 120*b* may decrypt the encrypted NAS security context container using one of the following methods M1, M2, and M3. (M1) to (M3) described below may be mapped in the same order as (M1) to (M3) described in step 407 above.

(M1) Method 1

The target AMF 120*b* may obtain the NAS security context container by decrypting the encrypted NAS security context container using the secret key allocated to the AMF set to which the target AMF 120*b* belongs.

(M2) Method 2

The target AMF 120*b* may obtain the protection key by decrypting the additional information included in the message in step 409*b* using the secret key allocated to the AMF set (target AMF set) to which the target AMF 120*b* belongs. The target AMF 120*b* may obtain the NAS security context container transmitted by the initial AMF 120*a* by decrypting the encrypted NAS security context container using the protection key.

(M3) Method 3

The target AMF 120*b* may generate the protection key using the secret key allocated to the AMF set (target AMF set) to which the target AMF 120*b* belongs and the public key ePK of the initial AMF 120*a* obtained from the additional information as materials of the key exchange algorithm (in an embodiment, the same key exchange algorithm as that used in method 3 (M3) of step 408). The target AMF 120*b* may obtain the NAS security context container transmitted by the initial AMF 120*a* by decrypting the encrypted NAS security context container using the protection key.

In an embodiment, the target AMF 120*b* may additionally generate an integrity protection key using the secret key allocated to the AMF set to which the target AMF 120*b* belongs and the public key ePK of the initial AMF obtained from the additional information as materials of the key exchange algorithm, and may verify the integrity of the value (e.g., a MAC tag value) that guarantees integrity included in the encrypted NAS security context container using the integrity protection key.

Through various embodiments as described above, the target AMF 120*b* may obtain the NAS security context container in step 410. In an embodiment, when the NAS security context container includes a "new NAS security context derived in step 408-1", step 411 may be additionally performed. For example, the target AMF 120*b* may identify that the obtained NAS security context is a new security context by identifying that the NAS security context container includes a "parameter (e.g., DeriviationInd) indicating that the new NAS security context is included".

In step 411, the UE 110 and the target AMF 120*b* may perform an SMC procedure for generating keys to be used for future secure communication between the UE 110 and the target AMF 120*b* based on the security context formed through the operations.

Through steps 410 to 411, a security context is formed between the UE 110 and the target AMF 120*b*. For example, encryption keys to be used for secure communication may be shared between the UE 110 and the target AMF 120*b*. Thereafter, if necessary, the UE 110 and the target AMF 120*b* may perform a series of operations for completing the registration procedure. In an embodiment, the UE 110 and the target AMF 120*b* may perform an authentication procedure, and may once again perform steps corresponding to step 411 in order to share a newly formed security context with each other and generate keys to be used for secure communication as a result of the authentication procedure.

Figure 5A:
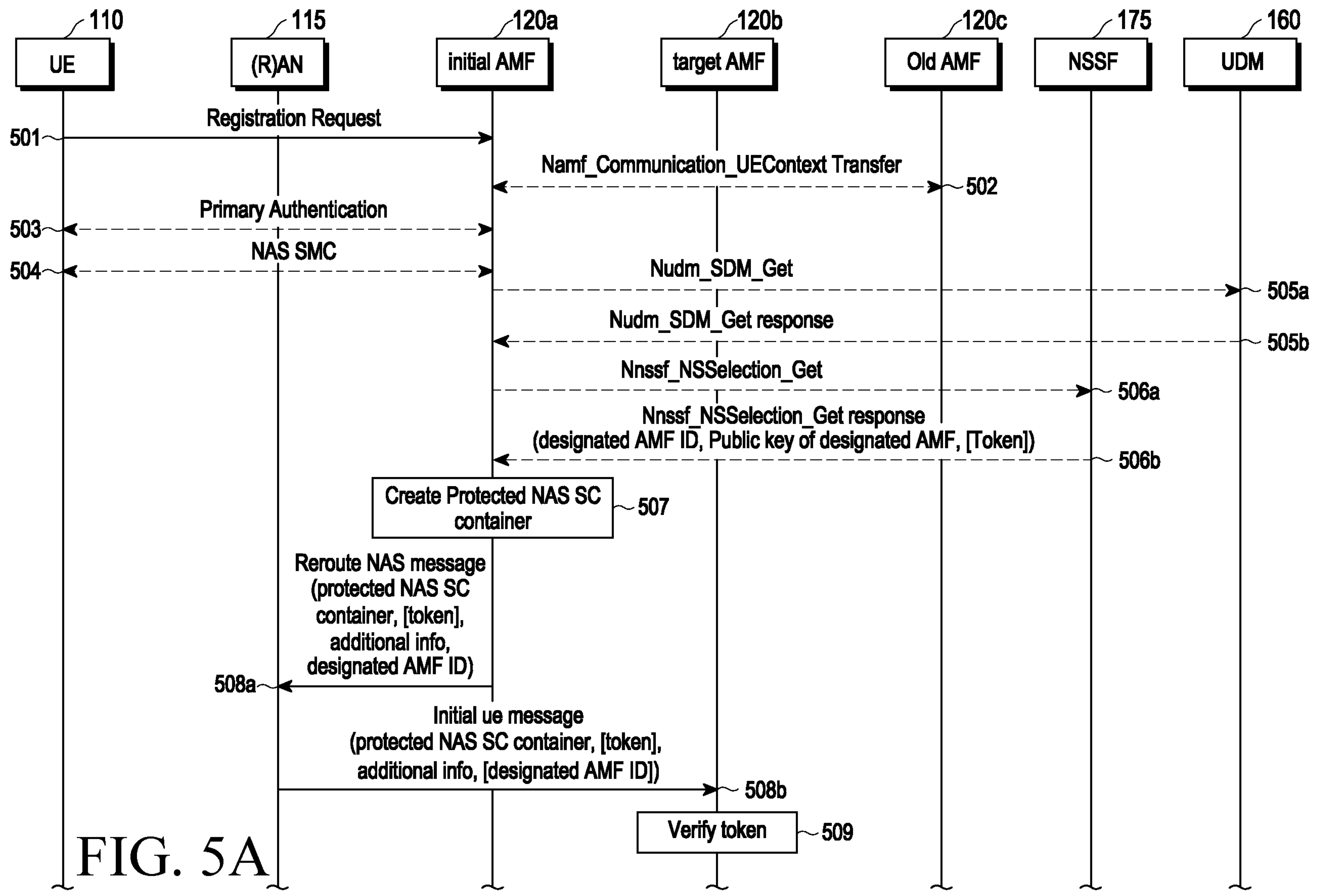
FIGS. 5A and 5B are views illustrating an example AMF reallocation procedure according to various embodiments of the disclosure.
Figure 5B:
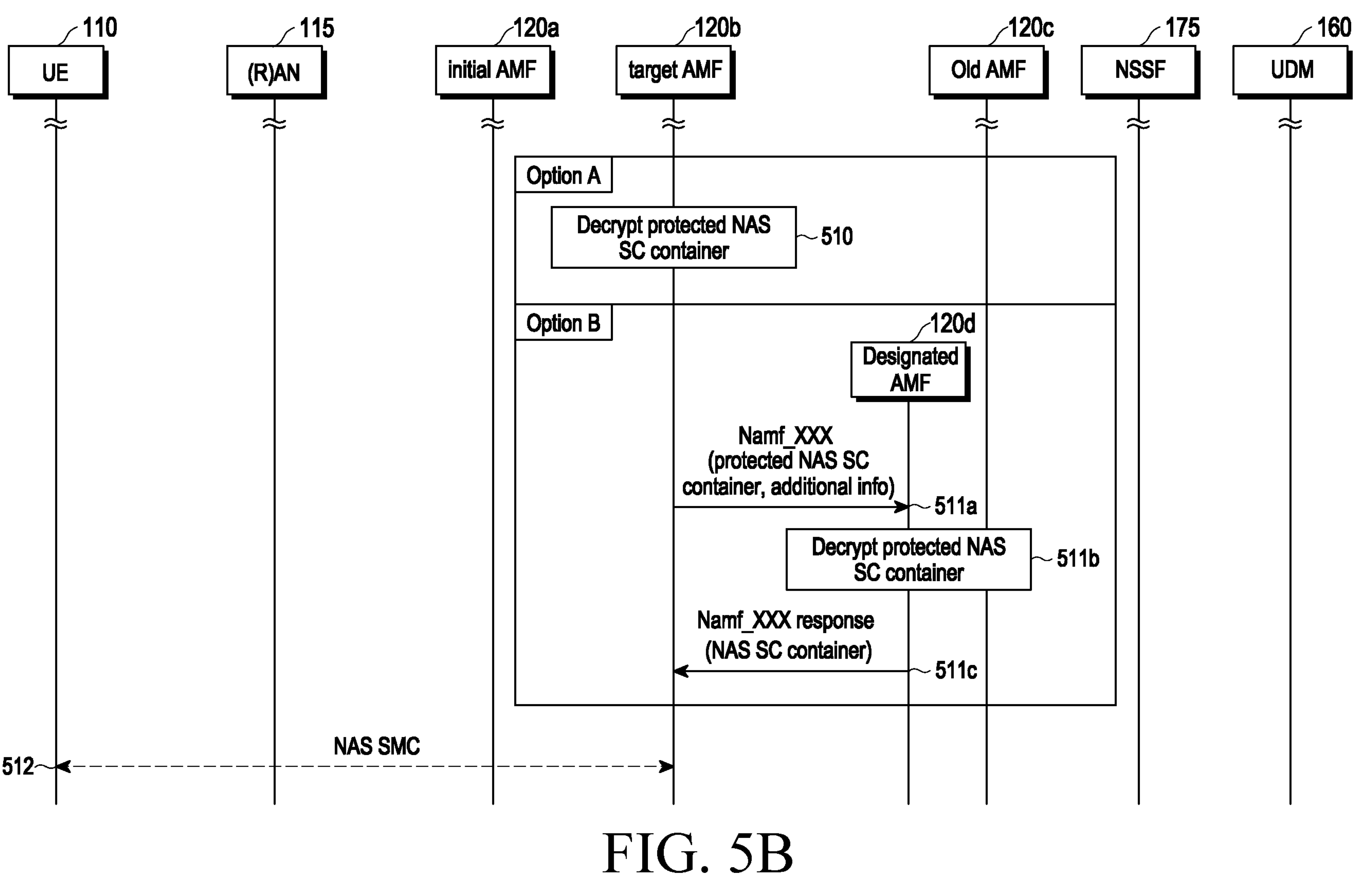

FIG. 5 (including FIGS. 5A and 5B) is a view illustrating an example AMF reallocation procedure according to various embodiments of the disclosure. Various embodiments may be implemented, including at least one of the steps described below.

For the procedure disclosed in FIG. 5, one or more of the following configurations may be performed in advance.

(A1) Pre-Configuration 1

At least one AMF present in the communication network may have encryption information for AMF reallocation (e.g., an asymmetric key pair including a public key and a secret key, or a secret key of an asymmetric key pair). The public key may be shared with the NSSF 175. The NSSF 175 may store and/or manage the public key in association with identification information (e.g., ID/name/address) about the corresponding AMF.

(A1) Pre-Configuration 2

At least one AMF present in the communication network may have a credential capable of verifying a token issued by the NSSF 175. In an embodiment, the credential may have the public key of the NSSF 175 for verifying the electronic signature of the NSSF 175 or information associated with the public key (e.g., an address for obtaining the public key of the NSSF 175) or an encryption key for verifying the message authentication code (MAC) generated by the NSSF 175 (or the shared secret for deriving the encryption key).

Referring to FIG. 5, in step 501, the UE 110 may transmit a registration request (RR) message to the initial AMF 120*a* through the RAN (e.g., base station) 115. In an embodiment, the registration request message may include information for identifying the UE 110 (e.g., any one of 5G-global unique temporary identifier (GUTI) or subscription concealed identifier (SUCI)). In an embodiment, the registration request message may further include network slicing information (e.g., requested network slice selection assistance information (NSSAI)) indicating the network slice(s) requested by the UE 110.

In an embodiment, if SUCI is included in the registration request message in step 501, step 502 may be omitted.

In an embodiment, if the registration request message in step 501 includes a 5G-GUTI, but there is no connection between the initial AMF 120*a* and the old AMF (e.g., the AMFs associated with the 5G-GUTI), step 502 may be omitted.

In an embodiment, if the registration request message in step 501 includes the 5G-GUTI and there is a connection between the initial AMF 120*a* and the old AMF 120*c* (e.g., the AMF associated with the 5G-GUTI), in step 502, the initial AMF 120*a* may transmit a request message, e.g., Namf_Communication_UEContext Transfer message, for requesting the transfer of the UE context to the old AMF 120*c*, and may receive a response including the UE context from the old AMF 120*c*. The UE context may include a security context established between the old AMF 120*c* and the UE 110. The security context may include security information that has been shared between the old AMF 120*c* and the UE 110 (including, e.g., at least one of a root key that has been shared between the old AMF 120*c* and the UE 110 or a key for encryption/integrity protection derived from the root key).

In an embodiment, the old AMF 120*c* may transmit the security context between the old AMF 120*c* and the UE 110 as it is in step 502. In an embodiment, the old AMF 120*c* may derive a new security context using the security context used between the old AMF 120*c* and the UE 110 in step 502 (including, e.g., an operation of deriving a new key using horizontal key derivation and then generating a new security context including the new key) and then transmit the new security context to the initial AMF 120*a*.

In step 503, primary authentication may be performed between the UE 110 and the initial AMF 120*a*. Through the primary authentication, the UE 110 and the initial AMF 120*a* may authenticate each other. Through the primary authentication, the UE 110 and the initial AMF 120*a* may share a security context to be used for future encryption communication with each other.

In an embodiment, step 503 may be performed when the SUCI is included in the registration request message of step 501. In an embodiment, step 503 may be performed when 5G-GUTI is included in the registration request message of step 501 but there is no connection between the initial AMF 120*a* and the old AMF 120*c*, or when the initial AMF 120*a* fails to properly obtain the security context formed between the UE 110 and the old AMF 120*c* from the old AMF 120*c* although there is a connection between the initial AMF 120*a* and the old AMF 120*c*.

In step 504, the UE 110 and the initial AMF 120*a* may share security information (e.g., an encryption key and/or a key for integrity protection) to be used for secure communication between the UE 110 and the initial AMF 120*a*.

In an embodiment, step 504 may be performed when step 503 is performed, e.g., when primary authentication is performed between the UE 110 and the initial AMF 120*a* and the security context is generated. In an embodiment, step 504 may be performed when the old AMF 120*c* derives a new security context and provides the new security context to the initial AMF 120*a* in step 502.

Through steps 502 to 504, a security context may be formed between the UE 110 and the initial AMF 120*a*. For example, encryption keys to be used for secure communication may be shared between the UE 110 and the initial AMF 120*a*. After step 504, when an unprotected message is received using at least one of the security context or the encryption keys, the UE 110 may reject the received message.

In an embodiment, the initial AMF 120*a* may perform the following steps 505*a* and 505*b* to obtain subscription information of the UE 110 for determining whether to reallocate the AMF from the UDM 160.

In step 505*a*, the initial AMF 120*a* may transmit a request message for requesting subscription information of the UE 110, e.g., a Nudm_SDM(subscription data management)_Get message, to the UDM 160. In an embodiment, although not disclosed in the drawings, the UDM 160 may obtain the subscription information from the UDR.

In step 505*b*, the UDM 160 may include the requested subscription information of the UE 110 in a response message, e.g., a Nudm_SDM_Get response message, and may transmit the response message to the initial AMF 120*a*.

In an embodiment, when it is determined that the initial AMF 120*a* is no longer capable of serving the UE 110 (for example, when the initial AMF 120*a* does not support all network slices requested by the UE 110 through the registration request message), the following steps 506*a* and 506*b* may be performed.

In step 506*a*, the initial AMF 120*a* may transmit a request message for requesting slice selection, e.g., the Nnssf_NSSelection_Get message, to the NSSF 175. In an embodiment, the Nnssf_NSSelection_Get message may include one or more of the following information:

- Information indicating network slices requested by the UE 110 (e.g., requested NSSAI(s)),
- Information indicating network slices allowed to be used by the UE 110 (e.g., allowed NSSAI(s)), or
- Information related to the UE 110 (e.g., SUPI for identifying the UE 110 and/or PLMN ID of serving the UE 110)

In an embodiment, the Nnssf_NSSelection_Get message is information for requesting "information of the AMF for reallocation", and may further include, e.g., a parameter for requesting encryption information (e.g., a public key) of a designated AMF 120*d*. In an embodiment, the Nnssf_NSSelection_Get message may further include a parameter for requesting a token issued by the NSSF 175.

In step 506*b*, the NSSF 175 may provide a response message including "information of the AMF for reallocation", e.g., the Nnssf_NSSelection_Get response message, to the initial AMF 120*a*. In an embodiment, the Nnssf_NSSelection_Get response message may include one or more of the following information:

- Information indicating the designated AMF(s) 120*d* (e.g., ID/name/address),
- Encryption information (e.g., public key) about the designated AMF(s) 120*d*, or
- Token issued by the NSSF 175

In an embodiment, the public key of the designed AMF(s) 120*d* may be a public key that corresponds to the secret key held by the designed AMF 120*d* and is shared with the NSSF 175 as described in pre-configuration 1 A1. In an embodiment, when the NSSF 175 receives the parameter for requesting the public key from the initial AMF 120*a* through the message in step 506*a*, the NSSF 175 may include the public key of the designed AMF(s) 120*d* in the message in step 506*b* and may send the message to the initial AMF 120*a*. In an embodiment, if the NSSF 175 receives the message in step 506*a*, the NSSF 175 may determine whether it is necessary to send the public key to the initial AMF 120*a* by itself, and then may include the public key of the designated AMF(s) 120*d* in the message in step 506*b* and send the message to the initial AMF 120*a* according to the result.

In an embodiment, the token issued by the NSSF 175 may be a value verifiable by AMFs using a pre-shared credential, as described in pre-configuration 2 A2. In an embodiment, when receiving a parameter for requesting a token issued by the NSSF 175 from the initial AMF 120*a* through the message in step 506*a*, the NSSF 175 may issue the token and may send the token to the initial AMF 120*a* through the message in step 506*b*. In an embodiment, when the NSSF 175 receives the message in step 506*a*, the NSSF 175 may determine whether it is necessary to send the token issued by the NSSF 175 to the initial AMF 120*a* on its own, issue the token according to the result thereof, and send the token to the initial AMF 120*a* through the message in step 506*b*.

In an embodiment, the token issued by the NSSF 175 may include one or more of the following information.

- Issuer: Information that may denote the NSSF 175 (e.g., name/ID/address)

Subject: Information (name, ID, or address) that may denote the initial AMF 120*a* and/or the AMF set to which the initial AMF 120*a* belongs.

Audience: Information (name, ID, or address) that may denote the designated AMF(s) 120*d* and/or the AMF set to which the designated AMF(s) 120*d* belongs.

Service name: Purpose of using the token. As an example, it may include a factor specifying that it is a token issued for AMF reallocation.

Time Info: Time Information related to token. For example, it may include at least one of the time when the token is issued, the time interval when the token is valid, and the time when the token expires.

'Electronic signature and/or MAC' generated by the NSSF 175 for all and/or some of the above-described information Hereinafter, other embodiments of steps 506*a* and 506*b* are described.

In steps 506*a* and 506*b* described above, the initial AMF 120*a* and the NSSF 175 exchange information through one request-response pair for ease of description, but in an embodiment, the operation in which the initial AMF 120*a* and the NSSF 175 exchange the information may include one or more request-response pairs. For example, the initial AMF 120*a* and the NSSF 175 may exchange the above-described information while exchanging one or more pairs of request and response messages (e.g., Nnssf_NSSelection_Get and Nnssf_NSSelection_Get response).

As an embodiment, the operation in which the initial AMF 120*a* and the NSSF 175 exchange the above-described information through two request-response pairs is described below. In an embodiment, the first request-response process and the second request-response may be performed immediately one after the other, or any other operation may be added between the first request-response and the second request-response.

[1] The initial AMF 120*a* may transmit an Nnssf_NSSelection_Get message for requesting slice selection to the NSSF 175 (e.g., step 506*a*). In an embodiment, the Nnssf_NSSelection_Get message may include one or more of the following information:

Information indicating network slices requested by the UE 110 (e.g., requested NSSAI(s)), Information indicating network slices allowed to be used by the UE 110 (e.g., allowed NSSAI(s)), or Information related to the UE 110 (e.g., PLMN ID of SUPI identifying the UE 110)

[2] The NSSF 175 may provide the Nnssf_NSSelection_Get response message including "information of the AMF to be reallocated" to the initial AMF 120*a* (e.g., step 506*b*). In an embodiment, the Nnssf_NSSelection_Get response message may include the following information:

Information indicating the target AMF set (e.g., target AMF set ID)

[3] The initial AMF 120*a* may transmit a message requesting encryption information of the designated AMF 120*d* (e.g., a public key of the designated AMF 120*d*) and/or a token issued by the NSSF 175 to the NSSF 175. In this case, the message sent by the initial AMF 120*a* may include one or more of the following information.

Target AMF set ID

Parameter for requesting encryption information of the designated AMF 120*d* (e.g., a public key of the designated AMF 120*d*), or Parameter requesting token issued by the NSSF 175

[4] In response to the message requesting the token, the NSSF 175 may transmit a message including one or more of the following information to the initial AMF 120*a*.

Information indicating the designated AMF(s) 120*d* (e.g., ID/name/address), Encryption information (e.g., public key) about the designated AMF(s) 120*d*, or Token issued by the NSSF 175

In an embodiment, the public key of the designed AMF(s) 120*d* may be a public key that corresponds to the secret key held by the designed AMF 120*d* and is shared with the NSSF 175 as described in pre-configuration 1 A1. In an embodiment, when the NSSF 175 receives the parameter for requesting the public key from the initial AMF 120*a* through the message in step [3], the NSSF 175 may include the public key of the designed AMF(s) 120*d* in the message in step [4] and may send the message to the initial AMF 120*a*. In an embodiment, if the NSSF 175 receives the message in step [3], the NSSF 175 may determine whether it is necessary to send the public key to the initial AMF 120*a* by itself, and then may include the public key of the designated AMF(s) 120*d* in the message in step [4] and send the message to the initial AMF 120*a* according to the result.

In an embodiment, the token issued by the NSSF 175 may be a value verifiable by AMFs using a pre-shared credential, as described in pre-configuration 2 A2. In an embodiment, when receiving a parameter for requesting a token issued by the NSSF 175 from the initial AMF 120*a* through the message in step [3], the NSSF 175 may issue the token and may send the token to the initial AMF 120*a* through the message in step [4]. In an embodiment, when the NSSF 175 receives the message in step [3], the NSSF 175 may determine whether it is necessary to send the token issued by the NSSF 175 to the initial AMF 120*a* on its own, issue the token according to the result thereof, and send the token to the initial AMF 120*a* through the message in step [4].

For a description of the token issued by the NSSF, a reference may be made to what has been described in step 506*b* above.

In the above-described embodiment, e.g., an operation in which the initial AMF 120*a* and the NSSF 175 exchange the information through two request-response pairs has been described, but the operation in which the initial AMF 120*a* and the NSSF 175 exchange the described information does not need to be limited to the above-described steps. It should be noted that the process in which the initial AMF 120*a* and the NSSF 175 exchange the information is not limited to the procedures described herein. For example, a process in which the initial AMF 120*a* and the NSSF 175 exchange the above-described information may be implemented through one or more "request-response" operation pairs. When a plurality of 'request-response' operation pairs are implemented, other steps not described herein may be performed between the 'request and response' of each pair as necessary.

In step 507, the initial AMF 120*a* may generate a 'protected NAS security context (SC) container'.

Although not shown, the process of generating the protected NAS security context container according to an embodiment may include some and/or all of the following steps 507-1 to 507-4.

In step 507-1, the initial AMF 120*a* may prepare a NAS security context (SC) to be sent to the designed AMF 120*d*. In an embodiment, the NAS security context may be the same as the NAS security context formed between the UE 110 and the initial AMF 120*a* through steps 501 to 504. In an embodiment, the NAS security context may be a new NAS security context derived from the NAS security context formed between the UE 110 and the initial AMF 120*a* through steps 501 to 504.

In step 507-2, the initial AMF 120*a* may configure a NAS security context container to be sent to the designated AMF 120*d*. In an embodiment, the NAS security context container may include the NAS security context prepared in step 507-1. In an embodiment, when the NAS security context is a new NAS security context derived from the NAS security context formed through steps 501 to 504, a parameter (e.g., 'DeriviationInd') indicating that the new NAS security context is included may be further included.

In step 507-3, the initial AMF 120*a* may obtain a public key of the designed AMF 120*d*. In an embodiment, the public key of the designed AMF 120*d* may be received from the NSSF 175 in step 506*b*. In an embodiment, the public key of the designed AMF 120*d* may be obtained from information previously stored in the initial AMF 120*a*.

In step 507-4, the initial AMF 120*a* may generate a protected NAS security context (SC) container using one of the following methods M1, M2, and M3.

(M1) Method 1

The initial AMF 120*a* may generate the protected NAS security context container by encrypting the NAS security context container prepared in step 507-2 using the public key prepared in step 507-3.

Additional information may not be generated.

(M2) Method 2

The initial AMF 120*a* may generate a protection key (e.g., a symmetric key) to encrypt the NAS security context container, and generate the protected NAS security context container by encrypting the NAS security context container prepared in step 507-2 using the protection key.

The initial AMF 120*a* may encrypt the protection key using the public key prepared in step 507-3, and generate additional information including the encrypted value.

(M3) Method 3

The initial AMF 120*a* may generate an asymmetric key pair (e.g., including the public key ePK and the secret key eSK). The initial AMF 120*a* may generate a protection key to encrypt the NAS security context container using the generated secret key eSK and the public key obtained in step 507-3 as materials of a key exchange algorithm (e.g., a Diffie-Hellman method). The initial AMF 120*a* may generate the protected NAS security context container by encrypting the NAS security context container prepared in step 507-2 using the protection key. Further, the initial AMF 120*a* may additionally generate an integrity protection key using the generated secret key eSK and the public key obtained in step 507-3 as materials of the key exchange algorithm and then generate a value (e.g., a MAC tag value) for ensuring the integrity of the protected NAS security context container (or NAS security context container) using the integrity protection key, and then include the value as part of the protected NAS security context container.

The initial AMF 120*a* may generate additional information including the public key ePK.

According to various embodiments as described above, in step 507, the initial AMF 120*a* may generate a "protected NAS security context container and additional information" to be sent to the designated AMF 120*d*.

In an embodiment, when the initial AMF 120*a* receives information (e.g., an ID and a public key) about only one designated AMF 120*d* in step 506*b*, the initial AMF 120*a* may generate "protected NAS security context container and additional information" using the information.

In an embodiment, when the initial AMF 120*a* receives information (e.g., ID-public key pairs) about a plurality of designed AMFs (e.g., including the designated AMF 120*d*) in step 506*b*, the initial AMF 120*a* may select one (e.g., the designated AMF 120*d*) from among the designed AMFs and generate "protected NAS security context container and additional information" using information associated with the selected AMF 120*d*.

In an embodiment, when the initial AMF 120*a* receives information (e.g., ID-public key pairs) about a plurality of designated AMFs (e.g., including the designated AMF 120*d*) in step 506*b*, the initial AMF 120*a* may select a plurality of designated AMFs (e.g., including the designated AMF 120*d*) from among the plurality of designated AMFs and generate "protected NAS security context containers and additional information" using information associated with the selected AMFs (e.g., including the designated AMF 120*d*).

In step 508*a*, the initial AMF 120*a* may transmit a reroute NAS message to the RAN 115. The reroute NAS message may include one or more of the following information.

Registration request (RR) message received from the UE 110 in step 501

Information indicating the designated AMF(s) 120*d* (e.g., name/ID/address), 'Protected NAS security context container and additional information' generated in step 507

Token obtained in step 506*b*

In step 508*b*, the RAN 115 may transmit an initial UE message including some and/or all of the information received through the message in step 508*a* to the target AMF 120*b*.

In an embodiment, when the initial AMF 120*a* sends information about only one designated AMF (e.g., the designated AMF 120*d*) in step 508*a*, the RAN 115 may identify whether a connection is established between the RAN 115 and the designated AMF 120*d*. If it is identified that a connection with the designed AMF 120*d* is established, the RAN 115 may set the designed AMF 120*d* as a 'target AMF and a self-selected designed AMF'. If it is identified that no connection with the Designed AMF 120*d* is established, the RAN 115 may select one of the AMF(s) having the connection with the RAN 115 from among the AMFs belonging to the AMF set such as the designed AMF 120*d*, set the selected AMF as the target AMF 120*b*, and set the designed AMF 120*d* notified of in step 508*a* as the self-selected designed AMF.

In an embodiment, when the initial AMF 120*a* sends information about a plurality of designed AMFs (e.g., including the designated AMF 120*d*) in step 508*a*, the RAN 115 may identify whether there is at least one AMF (e.g., the designated AMF 120*d*) that has connection with the RAN 115 among the designated AMFs. If one or more AMFs (e.g., the designated AMF 120*d*) have connection to the RAN 115 among the designed AMFs, the RAN 115 may select one (e.g., the designated AMF 120*d*) from among the one or more AMFs, and may set the selected AMF (e.g., the designated AMF 120*d*) as a target AMF and a self-selected designed AMF. If none of the designated AMFs have connection with the RAN 115, the RAN 115 may select one of the AMF(s) which have connection with the RAN 115 from among the AMFs belonging to the same AMF set as (at least one of) the designed AMFs, set the selected AMF as the target AMF 120*b*, select one from among the received designed AMFs notified of in step 508*a*, and select the selected designated AMF as the self-selected designated AMF (e.g., the designated AMF 120*d*).

Through the above-described process, the RAN 115 may set one (self-selected) designed AMF and one target AMF 120*b*. In an embodiment, the following two options may be present:

Option A: When the designed AMF 120*d* and the target AMF 120*b* are the same.

Option B: When the designated AMF 120*d* and the target AMF 120*b* are different.

In an embodiment, the message transmitted by the RAN 115 to the target AMF 120*b* in step 508*b* may include one or more of the following information.

Registration request (RR) message received from the UE 110 in step 508*a*

(For option B) Information denoting the designated AMF 120*d*

'Protected NAS security context container and its corresponding additional information' associated with the designed AMF 120*d*

Token received in step 508*a*

In step 509, when the token is included in the message in step 508*b*, the target AMF 120*b* may verify the validity of the token.

In an embodiment, the target AMF 120*b* may verify the validity of the token using a "credential capable of verifying the token issued by the NSSF" (e.g., refer to the description of pre-configuration 2 (A2)) previously held. In an embodiment, the target AMF 120*b* may verify the validity of the 'electronic signature and/or MAC generated by the NSSF' included in the token.

In an embodiment, the target AMF 120*b* may additionally perform one or more of the following verification steps for the token.

The target AMF 120*b* may identify the Issuer item included in the token. Accordingly, the target AMF 120*b* may verify that the token is generated from the reliable NSSF 175.

The target AMF 120*b* may identify the Subject item included in the token to identify the initial AMF 120*a* that has sent the protected NAS security context and/or the AMF set to which the initial AMF 120*a* belongs.

The target AMF 120*b* may identify information written on the Audience item included in the token. For example, the target AMF 120*b* may determine whether the information of the designed AMF 120*d* written on the Audience item matches its own information. As another example, the target AMF 120*b* may identify whether the information of the AMF set to which the designated AMF 120*d* belongs, written in the Audience item, matches the information of the AMF set to which the target AMF 120*b* belongs.

The target AMF 120*b* may identify the Time Info item included in the token to identify whether the token is valid at the current time point. included in the token.

Step 510 may be performed when "(option A) designed AMF 120*d* and target AMF 120*b* are the same" described in step 508*b*.

In an embodiment, the target AMF 120*b* may decrypt the 'protected NAS security context container' received in step 8*b* using one of the following methods M1, M2, and M3. (M1) to (M3) described below may be mapped in the same order as (M1) to (M3) described in step 507 above.

(M1) Method 1

The target AMF 120*b* may obtain the NAS security context container transmitted by the initial AMF 120*a* by decrypting the protected NAS security context container using its own secret key.

(M2) Method 2

The target AMF 120*b* may obtain the protection key by decrypting the additional information included in the message in step 508*b* using its own secret key. The target AMF 120*b* may obtain the NAS security context container transmitted by the initial AMF 120*a* by decrypting the protected NAS security context container using the protection key.

(M3) Method 3

The target AMF 120*b* may generate a protection key using its own secret key and additional information received in step 508*b*, e.g., the public key ePK of the initial AMF 120*a*, as materials of a key exchange algorithm (in an embodiment, the same key exchange algorithm as that used in method 3 (M3) of step 507). The target AMF 120*b* may obtain the NAS security context container transmitted by the initial AMF 120*a* by decrypting the protected NAS security context container using the protection key. Further, the target AMF 120*b* may additionally generate an integrity protection key using its own secret key and the public key ePK of the initial AMF 120*a* as materials of the key exchange algorithm, and then verify the integrity of a value (e.g., MAC tag value) that guarantees integrity included in the protected NAS security context container using the integrity protection key.

In an embodiment, steps 511*a* to 511*c*, which are described below, may be performed when "(option B) designed AMF 120*d* and target AMF 120*b* are different" described in step 508*b*.

In step 511*a*, the target AMF 120*b* may transmit, to the designed AMF 120*d* included in the message received in step 508*b*, a message including the "protected NAS security context container and its corresponding additional information" received in step 508*b*.

In step 511*b*, the designed AMF 120*d* may decrypt the 'protected NAS security context container' received in step 511*a* using one of the following methods M1, M2, and M3. (M1) to (M3) described below may be mapped in the same order as (M1) to (M3) described in step 507 above.

(M1) Method 1

The designated AMF 120*d* may obtain the NAS security context container transmitted by the initial AMF 120*a* by decrypting the protected NAS security context container using its own secret key.

(M2) Method 2

The designated AMF 120*d* may obtain the protection key by decrypting the additional information included in the message in step 511*a* using its own secret key. The designated AMF 120*d* may obtain the NAS security context container transmitted by the initial AMF 120*a* by decrypting the protected NAS security context container using the protection key.

(M3) Method 3

The designated AMF 120*d* may generate a protection key using its own secret key and additional information received in step 511*a*, e.g., the public key ePK of the initial AMF 120*a*, as materials of a key exchange algorithm (in an embodiment, the same key exchange algorithm as that used in method 3 (M3) of step 507). The designated AMF 120*d* may obtain the NAS security context container transmitted by the initial AMF 120*a* by decrypting the protected NAS security context container using the protection key. Further, the designated AMF 120*d* may additionally generate an integrity protection key using its own secret key and the public key ePK of the initial AMF 120*a* as materials of the key exchange algorithm, and then verify the integrity of a value (e.g., MAC tag value) that guarantees integrity included in the protected NAS security context container using the integrity protection key.

Through the various methods described above, as a result of 511*b*, the designed AMF 120*d* may obtain the NAS security context container transmitted by the initial AMF 120*a*.

In step 511*c*, the designed AMF 120*d* may transmit, to the target AMF 120*b*, a response message including the 'NAS security context container transmitted by the initial AMF 120*a*' obtained in step 511*b*.

In an embodiment, the target AMF 120*b* may obtain the NAS security context container through step 510 (option A) or steps 511*a* to 511*c* (option B). If the NAS security context container includes a parameter (e.g., DeriviationInd described in step 507-2) indicating that a new NAS security context is included, the target AMF 120*b* may further perform step 512.

In step 512, the UE 110 and the target AMF 120*b* may perform a security mode command (SMC) procedure for mutually sharing keys to be used for future secure communication between the UE 110 and the target AMF 120*b*.

Through the procedure disclosed in FIG. 5, a security context may be formed between the UE 110 and the target AMF 120*b*. For example, encryption keys to be used for secure communication may be shared between the UE 110 and the target AMF 120*b*. Although not disclosed in the drawings, the UE 110 and the target AMF 120*b* may then perform a series of operations for completing the registration procedure if necessary.

For example, in an embodiment, the UE 110 and the target AMF 120*b* may perform the primary authentication procedure described in step 503, and may once again perform steps corresponding to step 512 in order to share a newly formed security context with each other and generate keys to be used for secure communication as a result of the authentication procedure.

Figure 6:
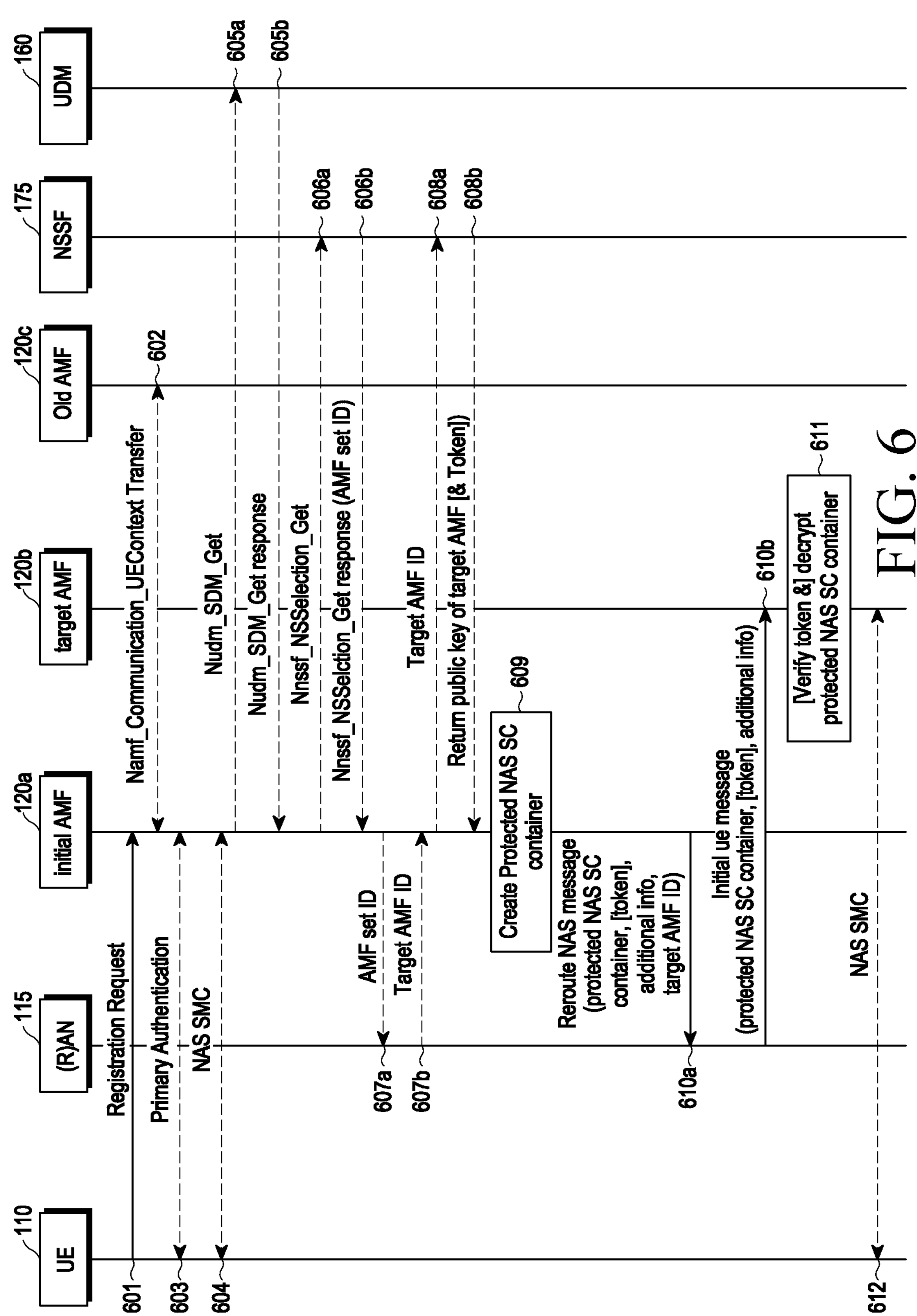
FIG. 6 is a view illustrating an example AMF reallocation procedure according to various embodiments of the disclosure.

FIG. 6 is a view illustrating an example AMF reallocation procedure according to various embodiments of the disclosure. Various embodiments may be implemented, including at least one of the steps described below.

For the procedure disclosed in FIG. 6, one or more of the following configurations may be performed in advance.

(A1) Pre-Configuration 1

The AMF present in the communication network may have encryption information (e.g., an asymmetric key pair including a public key and a secret key) for AMF reallocation.

(A1) Pre-Configuration 2

The AMF present in the communication network may have a credential capable of verifying a token issued by the NSSF 175. For example, the AMF may have, as an example of the credential, the public key of the NSSF 175 for verifying the electronic signature of the NSSF 175 or information associated with the public key (e.g., an address for obtaining the public key of the NSSF 175) or an encryption key for verifying the message authentication code (MAC) generated by the NSSF 175 (or the shared secret for deriving the encryption key).

Referring to FIG. 6, in step 601, the UE 110 may transmit a registration request (RR) message to the initial AMF 120*a* through the RAN (e.g., base station) 115. In an embodiment, the registration request message may include information for identifying the UE 110 (e.g., any one of 5G-global unique temporary identifier (GUTI) or subscription concealed identifier (SUCI)). In an embodiment, the registration request message may further include network slicing information (e.g., requested network slice selection assistance information (NSSAI)) indicating the network slice(s) requested by the UE 110.

In an embodiment, if SUCI is included in the registration request message in step 601, step 602 may be omitted. In an embodiment, if the registration request message in step 601 includes a 5G-GUTI, but there is no connection between the initial AMF 120*a* and the old AMF 120*c* (e.g., the AMF associated with the 5G-GUTI), step 602 may be omitted.

In an embodiment, if the registration request message in step 601 includes the 5G-GUTI and there is a connection between the initial AMF 120*a* and the old AMF 120*c*, in step 602, the initial AMF 120*a* may transmit a message, e.g., Namf_Communication_UEContext Transfer message, for requesting the transfer of the UE context to the old AMF 120*c*, and may receive a response including the UE context from the old AMF 120*c*. The UE context may include a security context established between the old AMF 120*c* and the UE 110. The security context may include security information that has been shared between the old AMF 120*c* and the UE 110 (including, e.g., at least one of a root key that has been shared between the old AMF 120*c* and the UE 110 or a key for encryption/integrity protection derived from the root key).

In an embodiment, the old AMF 120*c* may transmit the security context between the old AMF 120*c* and the UE 110 as it is in step 602. In an embodiment, the old AMF 120*c* may derive a new security context using the security context used between the old AMF 120*c* and the UE 110 in step 602 (including, e.g., an operation of deriving a new key using horizontal key derivation and then generating a new security context including the new key) and then transmit the new security context to the initial AMF 120*a*.

In step 603, primary authentication may be performed between the UE 110 and the initial AMF 120*a*. Through the primary authentication, the UE 110 and the initial AMF 120*a* may authenticate each other. Through the primary authentication, the UE 110 and the initial AMF 120*a* may share a security context to be used for future encryption communication with each other.

In an embodiment, step 603 may be performed when the SUCI is included in the registration request message of step 601. In an embodiment, step 603 may be performed when 5G-GUTI is included in the registration request message of step 601 but there is no connection between the initial AMF 120*a* and the old AMF 120*c*, or when the initial AMF 120*a* fails to properly obtain the security context formed between the UE 110 and the old AMF 120*c* from the old AMF 120*c* although there is a connection between the initial AMF 120*a* and the old AMF 120*c*.

In step 604, the UE 110 and the initial AMF 120*a* may generate security information (e.g., including keys) to be used for secure communication between the UE 110 and the initial AMF 120*a*.

In an embodiment, step 604 may be performed when the old AMF 120*c* derives a new security context and provides the new security context to the initial AMF 120*a* in step 602. In an embodiment, step 604 may be performed when step 603 is performed, e.g., when primary authentication is performed between the UE 110 and the initial AMF 120*a* and the security context is shared.

Through steps 602 to 604, a security context may be formed between the UE 110 and the initial AMF 120*a*. For example, encryption keys to be used for secure communication may be shared between the UE 110 and the initial AMF 120*a*. After step 604, when an unprotected message is received using at least one of the security context or the encryption keys, the UE 110 may reject the received message.

In an embodiment, the initial AMF 120*a* may perform the following steps 605*a* and 605*b* to obtain subscription information of the UE 110 for determining whether to reallocate the AMF from the UDM 160.

In step 605*a*, the initial AMF 120*a* may transmit a message for requesting subscription information of the UE 110, e.g., a DM (subscription data management)_Get message, to the UDM 160. In an embodiment, although not disclosed in the drawings, the UDM 160 may obtain the subscription information from the UDR.

In step 605*b*, the UDM 160 may include the requested subscription information of the UE 110 in a response message, e.g., a Nudm_SDM_Get response message, and may transmit the response message to the initial AMF 120*a*.

In step 606*a*, the initial AMF 120*a* may transmit a request message for requesting slice selection, e.g., the Nnssf_NSSelection_Get message, to the NSSF 175. In an embodiment, the Nnssf_NSSelection_Get message may include one or more of the following information:

- Information indicating network slices requested by the UE 110 (e.g., requested NSSAI(s)),
- Information indicating network slices allowed to be used by the UE 110 (e.g., allowed NSSAI(s)), or
- Information related to the UE 110 (e.g., PLMN ID of SUPI identifying the UE 110)

In step 606*b*, the NSSF 175 may provide a response message including "information of the AMF to be reallocated", e.g., the Nnssf_NSSelection_Get response message, to the initial AMF 120*a*. In an embodiment, the Nnssf_NSSelection_Get response message may include the following information:

- Information indicating the target AMF set (e.g., target AMF set ID),

In step 607*a*, the initial AMF 120*a* may transmit information (e.g., a target AMF set ID) indicating the target AMF set to the RAN 115.

In step 607*b*, the RAN 115 may perform one or more of the following operations.

- The RAN 115 may specify the target AMF set using the target AMF set ID received from the initial AMF 120*a*.
- The RAN 115 may identify whether there is an AMF connected to itself among the AMFs belonging to the received target AMF set.
- The RAN 115 may select one of the AMFs connected to the RAN 115 and set the selected AMF as the target AMF 120*b*.
- The RAN 115 may transmit information (e.g., at least one of an ID, an address, or a name) that may denote the AMF selected as the target AMF 120*b* (which may be referred to hereinafter as a target AMF ID for simplicity of description) to the initial AMF 120*a*.

In step 608*a*, the initial AMF 120*a* may transmit, to the NSSF 175, encryption information of the target AMF 120*b* (e.g., a public key of the target AMF 120*b*) and/or a request message for requesting a token issued by the NSSF 175. In an embodiment, the request message sent by the initial AMF 120*a* may include one or more of the following information.

- Target AMF ID
- Parameter for requesting encryption information of the designated AMF 120*d* (e.g., a public key of the target AMF 120*b*), or
- Parameter requesting token issued by the NSSF 175

In step 608*b*, the NSSF 175 may transmit a response message including one or more of the following information to the initial AMF 120*a*.

- Encryption information of the target AMF 120*b* (e.g., public key), or
- Token issued by the NSSF 175

In an embodiment, when the encryption information of the target AMF 120*b* includes the public key of the target AMF 120*b*, the public key of the target AMF 120*b* may be the public key held by the target AMF 120*b* described in pre-configuration 1 A1, and the public key may be previously shared with the NSSF 175. In an embodiment, when the NSSF 175 receives the parameter for requesting the encryption information of the target AMF 120*b* from the initial AMF 120*a* through the message in step 608*a*, the NSSF 175 may send the encryption information of the target AMF 120*b* to the initial AMF 120*a* in step 608*b*. In an embodiment, after receiving the message in step 608*a*, the NSSF 175 may, by itself, determine whether it is necessary to send the encryption information of the target AMF 120*b* to the initial AMF 120*a*, and then may send the encryption information of the target AMF 120*b* to the initial AMF 120*a* in step 608*b* according to a result thereof.

In an embodiment, the token issued by the NSSF 175 may be a value verifiable by the target AMF 120*b* using a pre-shared credential, as described in pre-configuration 2 A2. In an embodiment, when receiving a parameter for requesting a token issued by the NSSF 175 from the initial AMF 120*a* through the message in step 608*a*, the NSSF 175 may issue the token and may send the token to the initial AMF 120*a* in step 608*b*. In an embodiment, after receiving the message in step 608*a*, the NSSF 175 may determine by itself whether it is necessary to send the token issued by the NSSF 175 to the initial AMF 120*a*, issue the token according to the result thereof, and may send the token to the initial AMF in step 608*b*.

In an embodiment, the token issued by the NSSF 175 may include one or more of the following information.

- Issuer: Information that may denote the NSSF 175 (e.g., name/ID/address)
- Subject: Information (e.g., at least one of name, ID, or address) that may denote the initial AMF 120*a* or the AMF set to which the initial AMF 120*a* belongs.
- Audience: Information (e.g., at least one of name, ID, or address) that may denote the target AMF 120*b* or the target AMF set.
- Service name: Purpose of using the token. As an example, it may include a factor specifying that it is a token issued for AMF reallocation.
- Time Info: Time Information related to token. For example, it may include at least one of the time when the token is issued, the time interval when the token is valid, and the time when the token expires.
- 'Electronic signature and/or MAC' generated by the NSSF 175 for all and/or some of the above-described information In step 609, the initial AMF 120*a* may generate a 'protected NAS security context (SC) container'.

Although not shown, step 609 in an embodiment may include some and/or all of the following steps 609-1 to 609-4.

In step 609-1, the initial AMF 120*a* may prepare a NAS security context (NAS SC) to be sent to the target AMF 120*b*. In an embodiment, the NAS security context may be the same as the NAS security context formed between the UE 110 and the initial AMF 120*a* through steps 601 to 604. In an embodiment, the NAS security context may be a new NAS security context derived from the NAS security context formed between the UE 110 and the initial AMF 120*a* through steps 601 to 604.

In step 609-2, the initial AMF 120*a* may configure a NAS security context container to be sent to the target AMF 120*b*. In an embodiment, the NAS security context container may include the NAS security context prepared in step 609-1. In an embodiment, when the NAS security context is a new NAS security context derived from the NAS security context formed through steps 601 to 604, a parameter (e.g., 'DeriviationInd') indicating that the new NAS security context is included may be further included.

In step 609-3, the initial AMF 120*a* may prepare encryption information (e.g., a public key of the target AMF 120*b*) of the target AMF 120*b* to be used in the encryption process. In an embodiment, the public key of the target AMF 120*b* may be received from the NSSF 175 in step 606*b*. In an embodiment, the public key of the target AMF 120*b* may be information previously stored in the initial AMF 120*a*.

In step 609-4, the initial AMF 120*a* may generate a protected NAS security context (SC) container using one of the following methods M1, M2, and M3.

(M1) Method 1

- The initial AMF 120*a* may generate the protected NAS security context container by encrypting the NAS security context container prepared in step 609-2 using the public key prepared in step 609-3.
- Additional information may not be generated.

(M2) Method 2

- The initial AMF 120*a* may generate a protection key (e.g., a symmetric key) to encrypt the NAS security context container, and generate the protected NAS security context container by encrypting the NAS security context container prepared in step 609-2 using the protection key.
- The initial AMF 120*a* may encrypt the protection key using the public key prepared in 609-3, and generate additional information including the encrypted value.

(M3) Method 3

- The initial AMF 120*a* may generate an asymmetric key pair (e.g., including the public key ePK and the secret key eSK). The initial AMF 120*a* may generate a protection key to encrypt the NAS security context container using the generated secret key eSK and the public key prepared in step 609-3 as materials of a key exchange algorithm (e.g., a Diffie-Hellman method). The initial AMF 120*a* may generate the protected NAS security context container by encrypting the NAS security context container prepared in step 609-2 using the protection key. Further, the initial AMF 120*a* may additionally generate an integrity protection key using the generated secret key eSK and the public key prepared in step 609-3 as materials of the key exchange algorithm and then generate a value (e.g., a MAC tag value) for ensuring the integrity of the protected NAS security context container (or NAS security context container) using the integrity protection key, and then include the value as part of the protected NAS security context container.
- The initial AMF 120*a* may generate additional information including the public key ePK.

According to various embodiments as described above, in step 609, the initial AMF 120*a* may generate an "protected NAS security context container and additional information" to be sent to the target AMF 120*b*.

In step 610*a*, the initial AMF 120*a* may transmit a reroute NAS message to the RAN 115. The reroute NAS message may include one or more of the following information.

- Registration request (RR) message received from the UE 110 in step 601
- Target AMF ID
- 'Protected NAS security context container and additional information' generated in step 609
- Token obtained in step 608*b*

In step 610*b*, the RAN 115 may transmit an initial UE message including some and/or all of the information received through the message in step 610*a* to the target AMF 120*b*.

In an embodiment, the RAN 115 may set the target AMF 120*b* to which information is to be sent, using the target AMF ID received in step 601*a*, and may send a message to be described below to the target AMF 120*b*.

In an embodiment, the message transmitted by the RAN 115 to the target AMF 120*b* may include one or more of the following information.

- Registration request (RR) message received from the UE 110 in step 610*a*
- 'Protected NAS security context container and additional information' received in step 610*a*
- Token received in step 610*a*

Although not shown, in an embodiment, step 611 may include one or more of the following steps 611-1 and 612-2.

In step 611-1, when the token is included in the message in step 610*b*, the target AMF 120*b* may verify the validity of the token.

In an embodiment, the target AMF 120*b* may verify the validity of the token using a "credential capable of verifying the token issued by the NSSF" (e.g., refer to the description of pre-configuration 2 (A2)) previously held. In an embodiment, the target AMF 120*b* may verify the validity of the 'electronic signature and/or MAC generated by the NSSF' included in the token.

In an embodiment, the target AMF 120*b* may additionally perform one or more of the following verification steps for the token.

- The target AMF 120*b* may identify the Issuer item included in the token.

Accordingly, the target AMF 120*b* may verify that the token is generated from the reliable NSSF 175.

- The target AMF 120*b* may identify the Subject item included in the token to identify the initial AMF 120*a* that has sent the encrypted NAS security context and/or the AMF set to which the initial AMF 120*a* belongs.
- The target AMF 120*b* may identify the Audience item included in the token to identify whether the information of the target AMF 120*b* and/or the target AMF set to receive the encrypted NAS security context corresponds to the target AMF 120*b*.
- The target AMF 120*b* may identify the Time Info item included in the token to identify whether the token is valid at the current time point. included in the token.

In step 611-2, the target AMF 120*b* may decrypt the protected NAS security context container using one of the following methods M1, M2, or M3. (M1) to (M3) described below may be mapped in the same order as (M1) to (M3) described in step 809 above.

(M1) Method 1

- The target AMF 120*b* may obtain the NAS security context container transmitted by the initial AMF 120*a* by decrypting the protected NAS security context container using its own secret key.

(M2) Method 2

The target AMF 120*b* may obtain the protection key by decrypting the additional information included in the message in step 810*b* using its own secret key. The target AMF 120*b* may obtain the NAS security context container transmitted by the initial AMF 120*a* by decrypting the protected NAS security context container using the protection key.

(M3) Method 3

The target AMF 120*b* may generate a protection key using its own secret key and the public key ePK of the initial AMF 120*a* obtained from the additional information, as materials of a key exchange algorithm (in an embodiment, the same key exchange algorithm as that used in method 3 (M3) of step 609). The target AMF 120*b* may obtain the NAS security context container transmitted by the initial AMF 120*a* by decrypting the whole and/or part of the protected NAS security context container using the protection key.

The target AMF 120*b* may additionally generate an integrity protection key using its own secret key and the public key ePK of the initial AMF 120*a* obtained from the additional information as materials of the key exchange algorithm, and then verify the integrity of a value (e.g., MAC tag value) that guarantees integrity included in the protected NAS security context container using the integrity protection key.

Through various embodiments as described above, the target AMF 120*b* may obtain the NAS security context container in step 811. In an embodiment, the target AMF 120*b* may identify that the obtained NAS security context is a new security context when the NAS security context container includes a "parameter (e.g., DeriviationInd) indicating that the new NAS security context is included".

In step 612, the UE 110 and the target AMF 120*b* may perform a security mode command (SMC) procedure for generating keys to be used for future secure communication between the UE 110 and the target AMF 120*b* based on the security context formed through the operations.

Through the above steps, a security context is formed between the UE 110 and the target AMF 120*b*. For example, encryption keys to be used for secure communication may be shared between the UE 110 and the target AMF 120*b*. Thereafter, if necessary, the UE 110 and the target AMF 120*b* may perform a series of operations for completing the registration procedure. For example, in an embodiment, the UE 110 and the target AMF 120*b* may perform the primary authentication procedure described in step 603, and may once again perform steps corresponding to step 812 in order to share a newly formed security context with each other and generate keys to be used for secure communication as a result of the authentication procedure.

Figure 7:
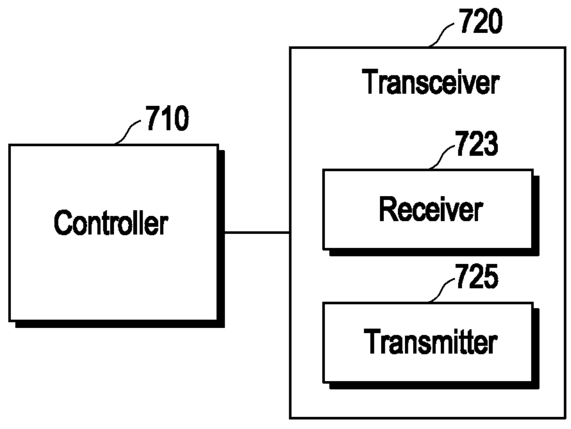
FIG. 7 is a view illustrating a configuration of a UE according to an embodiment of the present invention.

FIG. 7 is a view illustrating a configuration of a UE according to an embodiment of the present invention.

Referring to FIG. 7, a UE may include a transceiver 720 and a controller 710 operatively coupled with the transceiver 720 to control the overall operation of the UE. The transceiver 720 may include a transmitter 725 and a receiver 723.

The transceiver 720 may transmit/receive signals to/from other network entities (e.g., the initial AMF 120*a* or the base station 115).

The controller 710 may control the UE to perform any one operation of the above-described embodiments. Meanwhile, the controller 710 and the transceiver 720 are not necessarily implemented in separate modules but rather as a single component, e.g., a single chip. The controller 710 and the transceiver 720 may be electrically connected with each other. In an embodiment, the controller 710 may be a circuit, an application-specific circuit, or at least one processor. The operations of the UE may be realized by including a memory device storing a corresponding program code in a component (e.g., the control unit 710 and/or another components not shown) in the UE.

Figure 8:
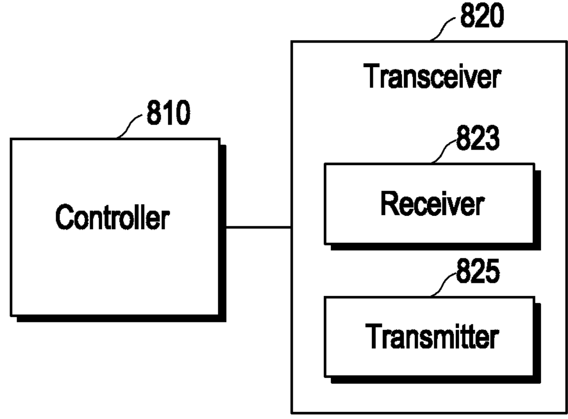
FIG. 8 is a view illustrating a configuration of a network entity according to an embodiment of the disclosure.

FIG. 8 is a view illustrating a configuration of a network entity according to an embodiment of the disclosure. The illustrated network entity may include at least one network function (e.g., base station 115, initial AMF 120*a*, target AMF 120*b*, old AMF 120*c*, NSSF 175, NRF 155, or UDM 160) depending on system implementations.

Referring to FIG. 8, the network entity may include a transceiver 820 and a controller 810 operatively coupled with the transceiver 820 to control the overall operation of the network entity. The transceiver 820 may include a transmitter 825 and a receiver 823.

The transceiver 820 may transmit and receive signals to/from a UE or other network entities.

The controller 810 may control the network entity to perform any one operation of the above-described embodiments. Meanwhile, the controller 810 and the transceiver 820 are not necessarily implemented in separate modules but rather as a single component, e.g., a single chip. The controller 810 and the transceiver 820 may be electrically connected with each other. In an embodiment, the controller 810 may be a circuit, an application-specific circuit, or at least one processor. The operations of the network entity may be realized by including a memory device storing a corresponding program code in a component (e.g., the control unit 810 and/or another components not shown) in the network entity.

A method by an initial AMF 120*a* performing access and mobility management function (AMF) reallocation in a communication system according to an embodiment may comprise receiving (201) a registration request message from a user equipment (UE), obtaining (202) a first security context for the UE, transmitting (206*a*), to a network slice selection function (NSSF), a first request message including at least one of a first parameter requesting a public key of an AMF to be reallocated or a second parameter requesting a token related to the AMF to be reallocated, receiving (206*b*), from the NSSF, a first response message including information indicating a target AMF set and at least one of a public key of the target AMF set or the token, generating (207) a security context container including a second security context for a target AMF 120*b* based on the first security context, encrypting (207) the security context container using the public key, and transmitting (208*a*, 208*b*) the encrypted security context container and at least one of additional information related to encryption of the security context container and the token to the target AMF 120*b* through a radio access network related to the UE.

A method by an initial AMF 120*a* performing access and mobility management function (AMF) reallocation in a communication system according to an embodiment may comprise receiving (301) a registration request message from a UE, obtaining (302) a first security context for the UE, transmitting (306*a*), to a network slice selection function (NSSF), a first request message including a first parameter requesting a public key of an AMF to be reallocated, receiving (306*b*), from the NSSF, a first response message including information indicating a target AMF set, transmitting (307*a*), to a network repository function (NRF) 155, a second request message including a second parameter requesting a token related to the AMF to be reallocated, receiving (307*b*), from the NRF 155, a second response message including a token related to the target AMF set, generating (308) a security context container including a second security context for a target AMF 120*b* based on the first security context, encrypting (308) the security context container using the public key, and transmitting (309*a*, 309*b*) the encrypted security context container and at least one of additional information related to encryption of the security context container and the token to the target AMF 120*b* through a radio access network related to the UE.

A method by an initial AMF 120*a* performing access and mobility management function (AMF) reallocation in a communication system according to an embodiment may comprise receiving (401) a registration request message from a UE, obtaining (402) a first security context for the UE, transmitting (406*a*), to a network slice selection function (NSSF), a first request message for network slice selection, receiving (406*b*), from the NSSF, a first response message including information indicating a target AMF set, transmitting (407*a*), to a network repository function (NRF) 155, a second request message including at least one of a first parameter requesting a public key of the target AMF set or a second parameter requesting a token related to the target AMF set, receiving (407*b*), from the NRF 155, a second response message including at least one of the public key of the target AMF set or the token, generating (408) a security context container including a second security context for a target AMF 120*b* based on the first security context, encrypting (408) the security context container using the public key, and transmitting (409*a*, 409*b*) the encrypted security context container and at least one of additional information related to encryption of the security context container and the token to the target AMF 120*b* through a radio access network related to the UE.

A method by an initial AMF 120*a* performing access and mobility management function (AMF) reallocation in a communication system according to an embodiment may comprise receiving (501) a registration request message from a user equipment (UE), obtaining (502) a first security context for the UE from a previous AMF, transmitting (506*a*), to a network slice selection function (NSSF), a first request message for network slice selection, receiving (506*b*), from the NSSF, a first response message including information indicating a target AMF set and at least one of a public key of the target AMF set or a token related to the target AMF set, generating (507) a security context container including a second security context for a target AMF based on the first security context, encrypting (507) the security context container using the public key, and transmitting (508*a*, 508*b*) the encrypted security context container and at least one of additional information related to encryption of the security context container and the token to the target AMF through a radio access network related to the UE.

A method by an initial AMF 120*a* performing access and mobility management function (AMF) reallocation in a communication system according to an embodiment may comprise receiving (601) a registration request message from a UE, obtaining (602) a first security context for the UE from a previous AMF, transmitting (606*a*), to a network slice selection function (NSSF), a first request message for network slice selection, receiving (606*b*), from the NSSF, a first response message including a target AMF set ID, transmitting (607*a*) the target AMF set ID to a radio access network related to the UE, receiving (607*b*) a target AMF ID for identifying a target AMF from the radio access network, transmitting (608*a*), to the NSSF, the target AMF ID, a first parameter requesting a public key of the target AMF, and a second parameter requesting a token related to the target AMF, receiving (608*b*) a public key of the target AMF and the token from the NSSF, generating (609) a security context container including a second security context for the target AMF based on the first security context, encrypting (609) the security context container using the public key, and transmitting (610*a*, 610*b*) the encrypted security context container and at least one of additional information related to encryption of the security context container and the token to the target AMF through a radio access network related to the UE.

A method by a target AMF 120*b* performing access and mobility management function (AMF) reallocation in a communication system according to an embodiment may comprise receiving, from a base station, an initial UE message including at least one of a registration request message of a UE, information for identifying a target AMF set, an encrypted security context container, additional information, or a token, verifying the token, obtaining a security context container including a security context for the UE transmitted by an initial AMF 120*a* by decrypting the encrypted security context container using the additional information, and performing a registration procedure with the UE using the security context.

It should be noted that the configuration views, example views of control/data signal transmission/reception methods, and example views of operational procedures of FIGS. 1 to 8 are not intended as limiting the scope of the disclosure. All the components, entities, or operational steps illustrated in FIGS. 1 to 8 should not be construed as essential components to practice the present invention, and the present invention may be rather implemented with only some of the components without departing from the gist of the present invention.

The operations of the above-described embodiments may be implemented by providing a memory device storing a corresponding program code in any component of the device. For example, the controller in the device may execute the above-described operations by reading and executing the program codes stored in the memory device by a processor or central processing unit (CPU).

As described herein, various components or modules in the entity, or UE may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

Although specific embodiments of the present invention have been described above, various changes may be made thereto without departing from the scope of the present invention. Thus, the scope of the disclosure should not be limited to the above-described embodiments, and should rather be defined by the following claims and equivalents thereof.

The invention claimed is:

1. A method by an access and mobility management function (AMF) for AMF reallocation in a communication system, the method comprising:

receiving a registration request message from a user equipment (UE);

obtaining a first security context for the UE from a previous AMF;

transmitting, to a network slice selection function (NSSF), a first request message including at least one of a first parameter requesting a public key of an AMF to be reallocated or a second parameter requesting a token related to the AMF to be reallocated;

receiving, from the NSSF, a first response message including information indicating a target AMF set and at least one of a public key of the target AMF set or the token;

generating a security context container including a second security context for a target AMF based on the first security context;

encrypting the security context container using the public key;

transmitting the encrypted security context container and at least one of additional information related to encryption of the security context container and the token to the target AMF through a radio access network related to the UE;

receiving a first registration request message from a first UE;

obtaining a third security context for the first UE from a first previous AMF;

transmitting, to the NSSF, a third request message including a third parameter requesting a public key of an AMF to be reallocated;

receiving, from the NSSF, a third response message including information indicating a first target AMF set;

transmitting, to a network repository function (NRF), a fourth request message including a fourth parameter requesting a token related to the AMF to be reallocated;

receiving, from the NRF, a fourth response message including a token related to the first target AMF set;

generating a first security context container including a fourth security context for a first target AMF based on the third security context;

encrypting the first security context container using the public key; and transmitting the encrypted first security context container and at least one of additional information related to encryption of the first security context container and the token to the first target AMF through a first radio access network related to the first UE.

2. The method of claim 1, wherein the token includes, as information verifiable by the target AMF, at least one of:

an issuer item for identifying the NSSF;

a subject item for identifying an initial AMF or an AMF set where the initial AMF belongs;

an audience item for identifying the target AMF or the target AMF set where the target AMF belongs;

a service name item indicating that the token is for AMF reallocation;

a time information item indicating a time when the token is valid; or at least one of an electronic signature and/or a message authentication code (MAC) generated for at least one of the items.

3. The method of claim 1, further comprising:

transmitting a second request message for requesting subscriber information about the UE to a unified data management (UDM) for data storage and management; and receiving a second response message including the subscriber information.

4. The method of claim 1, wherein the token includes, as information verifiable by the first target AMF, at least one of:

an issuer item for identifying the NSSF;

a subject item for identifying an initial AMF or an AMF set where the initial AMF belongs;

an audience item for identifying the first target AMF or a first target AMF set where the target AMF belongs;

a service name item indicating that the token is for AMF reallocation;

a time information item indicating a time when the token is valid; or at least one of an electronic signature and/or a message authentication code (MAC) generated for at least one of the items.

5. The method of claim 1, further comprising:

receiving a second registration request message from a second UE;

obtaining a fifth security context for the second UE from a second previous AMF;

transmitting, to the NSSF, a fifth request message for network slice selection;

receiving, from the NSSF, a fifth response message including information indicating a second target AMF set;

transmitting, to the NRF, a sixth request message including at least one of a fifth parameter requesting a public key of the second target AMF set or a sixth parameter requesting a token related to the second target AMF set;

receiving, from the NRF, a sixth response message including at least one of the public key of the second target AMF set or the token;

generating a second security context container including a sixth security context for a second target AMF based on the fifth security context;

encrypting the second security context container using the public key; and transmitting the encrypted second security context container and at least one of additional information related to encryption of the second security context container and the token to the second target AMF through a second radio access network related to the second UE.

6. The method of claim 5, wherein the token includes, as information verifiable by the second target AMF, at least one of:

an issuer item for identifying the NSSF;

a subject item for identifying an initial AMF or an AMF set where the initial AMF belongs;

an audience item for identifying the second target AMF or the second target AMF set where the second target AMF belongs;

a service name item indicating that the token is for AMF reallocation;

a time information item indicating a time when the token is valid; or at least one of an electronic signature and/or a message authentication code (MAC) generated for at least one of the items.

7. The method of claim 1, further comprising:

receiving a third registration request message from a third UE;

obtaining a seventh security context for the third UE from a third previous AMF;

transmitting, to the NSSF, a seventh request message for network slice selection;

receiving, from the NSSF, a seventh response message including information indicating a third target AMF set and at least one of a public key of the third target AMF set or a token related to the third target AMF set;

generating a third security context container including a eighth security context for a third target AMF based on the seventh security context;

encrypting the third security context container using the public key; and transmitting the encrypted third security context container and at least one of additional information related to encryption of the third security context container and the token to the third target AMF through a third radio access network related to the third UE.

8. The method of claim 7, wherein the token includes, as information verifiable by the third target AMF, at least one of:

an issuer item for identifying the NSSF;

a subject item for identifying an initial AMF or an AMF set where the initial AMF belongs;

an audience item for identifying the third target AMF or the third target AMF set where the third target AMF belongs;

a service name item indicating that the token is for AMF reallocation;

a time information item indicating a time when the token is valid; or at least one of an electronic signature and/or a message authentication code (MAC) generated for at least one of the items.

9. The method of claim 1, further comprising:

receiving a fourth registration request message from a fourth UE;

obtaining a ninth security context for the fourth UE from a fourth previous AMF;

transmitting, to the NSSF, a ninth request message for network slice selection;

receiving, from the NSSF, a ninth response message including a target AMF set ID;

transmitting the target AMF set ID to a fourth radio access network related to the fourth UE;

receiving a target AMF ID for identifying a fourth target AMF from the fourth radio access network;

transmitting, to the NSSF, the target AMF ID, a seventh parameter requesting a public key of the target AMF, and a ninth parameter requesting a token related to the fourth target AMF;

receiving a public key of the fourth target AMF and the token from the NSSF;

generating a fourth security context container including a tenth security context for the fourth target AMF based on the ninth security context;

encrypting the fourth security context container using the public key; and transmitting the encrypted fourth security context container and at least one of additional information related to encryption of the fourth security context container and the token to the fourth target AMF through the fourth radio access network related to the fourth UE.

10. The method of claim 9, wherein the token includes, as information verifiable by the fourth target AMF, at least one of:

an issuer item for identifying the NSSF;

a subject item for identifying an initial AMF or an AMF set where the initial AMF belongs;

an audience item for identifying the fourth target AMF or a fourth target AMF set where the fourth target AMF belongs;

a service name item indicating that the token is for AMF reallocation;

a time information item indicating a time when the token is valid; or at least one of an electronic signature and/or a message authentication code (MAC) generated for at least one of the items.

11. An access and mobility management function (AMF) entity for performing AMF reallocation in a communication system, the AMF entity comprising:

a transceiver configured to communicate with another network entity; and a controller operatively coupled with the transceiver, wherein the controller is configured to:

receive a registration request message from a user equipment (UE), obtain a first security context for the UE from a previous AMF, transmit, to a network slice selection function (NSSF), a first request message including at least one of a first parameter requesting a public key of an AMF to be reallocated or a second parameter requesting a token related to the AMF to be reallocated, receive, from the NSSF, a first response message including information indicating a target AMF set and at least one of a public key of the target AMF set or the token, generate a security context container including a second security context for a target AMF based on the first security context, encrypt the security context container using the public key, transmit the encrypted security context container and at least one of additional information related to encryption of the security context container and the token to the target AMF through a radio access network related to the UE, receive a first registration request message from a first UE, obtain a third security context for the first UE from a first previous AMF, transmit, to the NSSF, a third request message including a third parameter requesting a public key of an AMF to be reallocated, receive, from the NSSF, a third response message including information indicating a first target AMF set, transmit, to a network repository function (NRF), a fourth request message including a fourth parameter requesting a token related to the AMF to be reallocated, receive, from the NRF, a fourth response message including a token related to the first target AMF set, generate a first security context container including a fourth security context for a first target AMF based on the third security context, encrypt the first security context container using the public key, and transmit the encrypted first security context container and at least one of additional information related to encryption of the first security context container and the token to the first target AMF through a first radio access network related to the first UE.

12. The AMF entity of claim 11, wherein the controller is further configured to:

receive a second registration request message from a second UE, obtain a fifth security context for the second UE from a second previous AMF, transmit, to the NSSF, a fifth request message for network slice selection, receive, from the NSSF, a fifth response message including information indicating a second target AMF set, transmit, to the NRF, a sixth request message including at least one of a fifth parameter requesting a public key of the second target AMF set or a sixth parameter requesting a token related to the second target AMF set, receive, from the NRF, a sixth response message including at least one of the public key of the second target AMF set or the token, generate a second security context container including a sixth security context for a second target AMF based on the fifth security context, encrypt the second security context container using the public key, and transmit the encrypted second security context container and at least one of additional information related to encryption of the second security context container and the token to the second target AMF through a second radio access network related to the second UE.

13. The AMF entity of claim 11, wherein the controller is further configured to:

receive a third registration request message from a third UE, obtain a seventh security context for the third UE from a third previous AMF, transmit, to the NSSF, a seventh request message for network slice selection, receive, from the NSSF, a seventh response message including information indicating a third target AMF set and at least one of a public key of the third target AMF set or a token related to the third target AMF set, generate a third security context container including a eighth security context for a third target AMF based on the seventh security context, encrypt the third security context container using the public key, and transmit the encrypted third security context container and at least one of additional information related to encryption of the third security context container and the token to the third target AMF through a third radio access network related to the third UE.

14. The AMF entity of claim 11, wherein the controller is further configured to:

receive a fourth registration request message from a fourth UE, obtain a ninth security context for the fourth UE from a fourth previous AMF, transmit, to the NSSF, a ninth request message for network slice selection, receive, from the NSSF, a ninth response message including a target AMF set ID, transmit the target AMF set ID to a fourth radio access network related to the fourth UE, receive a target AMF ID for identifying a fourth target AMF from the fourth radio access network, transmit, to the NSSF, the target AMF ID, a seventh parameter requesting a public key of the target AMF, and a ninth parameter requesting a token related to the fourth target AMF, receive a public key of the fourth target AMF and the token from the NSSF, generate a fourth security context container including a tenth security context for the fourth target AMF based on the ninth security context, encrypt the fourth security context container using the public key, and transmit the encrypted fourth security context container and at least one of additional information related to encryption of the fourth security context container and the token to the fourth target AMF through the fourth radio access network related to the fourth UE.

* * * * *